United States Patent
Chang et al.

(10) Patent No.: US 10,824,654 B2
(45) Date of Patent: Nov. 3, 2020

(54) GEOLOCATION-BASED PICTOGRAPHS

(71) Applicant: Snap Inc., Santa Monica, CA (US)

(72) Inventors: Sheldon Chang, Venice, CA (US);
Timothy Michael Sehn, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 268 days.

(21) Appl. No.: 14/548,590

(22) Filed: Nov. 20, 2014

(65) Prior Publication Data

US 2016/0085773 A1 Mar. 24, 2016

Related U.S. Application Data

(60) Provisional application No. 62/052,405, filed on Sep. 18, 2014.

(51) Int. Cl.
| | |
|---|---|
| G06F 3/048 | (2013.01) |
| G06F 16/29 | (2019.01) |
| G06F 3/0484 | (2013.01) |
| G06F 3/0488 | (2013.01) |
| G06F 3/0482 | (2013.01) |
| G06F 3/0481 | (2013.01) |
| G06F 16/955 | (2019.01) |
| H04W 4/029 | (2018.01) |
| H04L 12/58 | (2006.01) |

(Continued)

(52) U.S. Cl.
CPC ............ *G06F 16/29* (2019.01); *G06F 3/0237* (2013.01); *G06F 3/0482* (2013.01); *G06F 3/0484* (2013.01); *G06F 3/04817* (2013.01); *G06F 3/04842* (2013.01); *G06F 3/04886* (2013.01); *G06F 16/58* (2019.01); *G06F 16/955* (2019.01); *G06F 16/9537* (2019.01); *H04L 51/10* (2013.01); *H04L 51/20* (2013.01); *H04W 4/029* (2018.02); *H04L 51/32* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 666,223 | A | 1/1901 | Shedlock |
| 4,581,634 | A | 4/1986 | Williams |

(Continued)

FOREIGN PATENT DOCUMENTS

| | | | |
|---|---|---|---|
| CA | 2887596 | A1 | 7/2015 |
| EP | 2051480 | A1 | 4/2009 |

(Continued)

OTHER PUBLICATIONS

"International Application Serial No. PCT/US2015/050424, International Search Report dated Dec. 4, 2015", 2 pgs.

(Continued)

*Primary Examiner* — Thanh T Vu
(74) *Attorney, Agent, or Firm* — Schwegman Lundberg & Woessner, P.A.

(57) ABSTRACT

A system and method for geolocation-based pictographs are provided. In example embodiments, a current geolocation of a user device is determined. A pictograph is identified based on the current geolocation of the user device. The identified pictograph is presented on a user interface of the user device.

25 Claims, 16 Drawing Sheets

(51) Int. Cl.
  *G06F 16/58* (2019.01)
  *G06F 3/023* (2006.01)
  *G06F 16/9537* (2019.01)
  *H04W 4/80* (2018.01)

(56) References Cited

U.S. PATENT DOCUMENTS

| | | | |
|---|---|---|---|
| 4,975,690 A | 12/1990 | Torres | |
| 5,072,412 A | 12/1991 | Henderson, Jr. et al. | |
| 5,493,692 A | 2/1996 | Theimer et al. | |
| 5,713,073 A | 1/1998 | Warsta | |
| 5,754,939 A | 5/1998 | Herz et al. | |
| 5,855,008 A | 12/1998 | Goldhaber et al. | |
| 5,883,639 A | 3/1999 | Walton et al. | |
| 5,999,932 A | 12/1999 | Paul | |
| 6,012,098 A | 1/2000 | Bayeh et al. | |
| 6,014,090 A | 1/2000 | Rosen et al. | |
| 6,029,141 A | 2/2000 | Bezos et al. | |
| 6,038,295 A | 3/2000 | Mattes | |
| 6,049,711 A | 4/2000 | Yehezkel et al. | |
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,205,432 B1 | 3/2001 | Gabbard et al. | |
| 6,216,141 B1 | 4/2001 | Straub et al. | |
| 6,285,381 B1 | 9/2001 | Sawano et al. | |
| 6,285,987 B1 | 9/2001 | Roth et al. | |
| 6,310,694 B1 | 10/2001 | Okimoto et al. | |
| 6,317,789 B1 | 11/2001 | Rakavy et al. | |
| 6,334,149 B1 | 12/2001 | Davis, Jr. et al. | |
| 6,349,203 B1 | 2/2002 | Asaoka et al. | |
| 6,353,170 B1 | 3/2002 | Eyzaguirre et al. | |
| 6,446,004 B1 | 9/2002 | Cao et al. | |
| 6,449,657 B2 | 9/2002 | Stanbach et al. | |
| 6,456,852 B2 | 9/2002 | Bar et al. | |
| 6,484,196 B1 | 11/2002 | Maurille | |
| 6,487,601 B1 | 11/2002 | Hubacher et al. | |
| 6,523,008 B1 | 2/2003 | Avrunin | |
| 6,542,749 B2 | 4/2003 | Tanaka et al. | |
| 6,549,768 B1 | 4/2003 | Fraccaroli | |
| 6,618,593 B1 | 9/2003 | Drutman et al. | |
| 6,622,174 B1 | 9/2003 | Ukita et al. | |
| 6,631,463 B1 | 10/2003 | Floyd et al. | |
| 6,636,247 B1 | 10/2003 | Hamzy et al. | |
| 6,636,855 B2 | 10/2003 | Holloway et al. | |
| 6,643,684 B1 | 11/2003 | Malkin et al. | |
| 6,658,095 B1 | 12/2003 | Yoakum et al. | |
| 6,665,531 B1 | 12/2003 | Soderbacka et al. | |
| 6,668,173 B2 | 12/2003 | Greene | |
| 6,684,238 B1 | 1/2004 | Dutta | |
| 6,684,257 B1 | 1/2004 | Camut et al. | |
| 6,698,020 B1 | 2/2004 | Zigmond et al. | |
| 6,700,506 B1 | 3/2004 | Winkler | |
| 6,720,860 B1 | 4/2004 | Narayanaswami | |
| 6,724,403 B1 | 4/2004 | Santoro et al. | |
| 6,757,713 B1 | 6/2004 | Ogilvie et al. | |
| 6,832,222 B1 | 12/2004 | Zimowski | |
| 6,834,195 B2 | 12/2004 | Brandenberg et al. | |
| 6,836,792 B1 | 12/2004 | Chen | |
| 6,898,626 B2 | 5/2005 | Ohashi | |
| 6,959,324 B1 | 10/2005 | Kubik et al. | |
| 6,970,088 B2 | 11/2005 | Kovach | |
| 6,970,907 B1 | 11/2005 | Ullmann et al. | |
| 6,980,909 B2 | 12/2005 | Root et al. | |
| 6,981,040 B1 | 12/2005 | Konig et al. | |
| 7,020,494 B2 | 3/2006 | Spriestersbach et al. | |
| 7,027,124 B2 | 4/2006 | Foote et al. | |
| 7,072,963 B2 | 7/2006 | Anderson et al. | |
| 7,085,571 B2 | 8/2006 | Kalhan et al. | |
| 7,110,744 B2 | 9/2006 | Freeny, Jr. | |
| 7,124,164 B1 | 10/2006 | Chemtob | |
| 7,149,893 B1 | 12/2006 | Leonard et al. | |
| 7,173,651 B1 | 2/2007 | Knowles | |
| 7,188,143 B2 | 3/2007 | Szeto | |
| 7,203,380 B2 | 4/2007 | Chiu et al. | |
| 7,206,568 B2 | 4/2007 | Sudit | |
| 7,227,937 B1 | 6/2007 | Yoakum et al. | |
| 7,237,002 B1 | 6/2007 | Estrada et al. | |
| 7,240,089 B2 | 7/2007 | Boudreau | |
| 7,269,426 B2 | 9/2007 | Kokkonen et al. | |
| 7,280,658 B2 | 10/2007 | Amini et al. | |
| 7,315,823 B2 | 1/2008 | Bröndrup | |
| 7,349,768 B2 | 3/2008 | Bruce et al. | |
| 7,356,564 B2 | 4/2008 | Hartselle et al. | |
| 7,394,345 B1 | 7/2008 | Ehlinger et al. | |
| 7,411,493 B2 | 8/2008 | Smith | |
| 7,423,580 B2 | 9/2008 | Markhovsky et al. | |
| 7,454,442 B2 | 11/2008 | Cobleigh et al. | |
| 7,508,419 B2 | 3/2009 | Toyama et al. | |
| 7,512,649 B2 | 3/2009 | Faybishenko et al. | |
| 7,519,670 B2 | 4/2009 | Hagale et al. | |
| 7,535,890 B2 | 5/2009 | Rojas | |
| 7,546,554 B2 | 6/2009 | Chiu et al. | |
| 7,607,096 B2 | 10/2009 | Oreizy et al. | |
| 7,639,943 B1 | 12/2009 | Kalajan | |
| 7,650,231 B2 | 1/2010 | Gadler | |
| 7,668,537 B2 | 2/2010 | DeVries | |
| 7,770,137 B2 | 8/2010 | Forbes et al. | |
| 7,778,973 B2 | 8/2010 | Choi | |
| 7,779,444 B2 | 8/2010 | Glad | |
| 7,787,886 B2 | 8/2010 | Markhovsky et al. | |
| 7,796,946 B2 | 9/2010 | Eisenbach | |
| 7,801,954 B2 | 9/2010 | Cadiz et al. | |
| 7,856,360 B2 | 12/2010 | Kramer et al. | |
| 8,001,204 B2 | 8/2011 | Burtner et al. | |
| 8,032,586 B2 | 10/2011 | Challenger et al. | |
| 8,082,255 B1 | 12/2011 | Carlson, Jr. et al. | |
| 8,090,351 B2 | 1/2012 | Klein | |
| 8,098,904 B2 | 1/2012 | Ioffe et al. | |
| 8,099,109 B2 | 1/2012 | Altman et al. | |
| 8,112,716 B2 | 2/2012 | Kobayashi | |
| 8,131,597 B2 | 3/2012 | Hudetz | |
| 8,135,166 B2 | 3/2012 | Rhoads | |
| 8,136,028 B1 | 3/2012 | Loeb et al. | |
| 8,146,001 B1 | 3/2012 | Reese | |
| 8,161,115 B2 | 4/2012 | Yamamoto | |
| 8,161,417 B1 | 4/2012 | Lee | |
| 8,195,203 B1 | 6/2012 | Tseng | |
| 8,199,747 B2 | 6/2012 | Rojas et al. | |
| 8,208,943 B2 | 6/2012 | Petersen | |
| 8,214,443 B2 | 7/2012 | Hamburg | |
| 8,234,350 B1 | 7/2012 | Gu et al. | |
| 8,276,092 B1 | 9/2012 | Narayanan et al. | |
| 8,279,319 B2 | 10/2012 | Date | |
| 8,280,406 B2 | 10/2012 | Ziskind et al. | |
| 8,285,199 B2 | 10/2012 | Hsu et al. | |
| 8,287,380 B2 | 10/2012 | Nguyen et al. | |
| 8,301,159 B2 | 10/2012 | Hamynen et al. | |
| 8,306,922 B1 | 11/2012 | Kunal et al. | |
| 8,312,086 B2 | 11/2012 | Velusamy et al. | |
| 8,312,097 B1 | 11/2012 | Siegel et al. | |
| 8,326,315 B2 | 12/2012 | Phillips et al. | |
| 8,326,327 B2 | 12/2012 | Hymel et al. | |
| 8,332,475 B2 | 12/2012 | Rosen et al. | |
| 8,352,546 B1 | 1/2013 | Dollard | |
| 8,379,130 B2 | 2/2013 | Forutanpour et al. | |
| 8,385,950 B1 | 2/2013 | Wagner et al. | |
| 8,402,097 B2 | 3/2013 | Szeto | |
| 8,405,773 B2 | 3/2013 | Hayashi et al. | |
| 8,418,067 B2 | 4/2013 | Cheng et al. | |
| 8,423,409 B2 | 4/2013 | Rao | |
| 8,471,914 B2 | 6/2013 | Sakiyama et al. | |
| 8,472,935 B1 | 6/2013 | Fujisaki | |
| 8,510,383 B2 | 8/2013 | Hurley et al. | |
| 8,527,345 B2 | 9/2013 | Rothschild et al. | |
| 8,554,627 B2 | 10/2013 | Svendsen et al. | |
| 8,560,612 B2 | 10/2013 | Kilmer et al. | |
| 8,594,680 B2 | 11/2013 | Ledlie et al. | |
| 8,613,089 B1 | 12/2013 | Holloway et al. | |
| 8,660,358 B1 * | 2/2014 | Bergboer et al. | 382/190 |
| 8,660,369 B2 | 2/2014 | Llano et al. | |
| 8,660,793 B2 | 2/2014 | Ngo et al. | |
| 8,682,350 B2 | 3/2014 | Altman et al. | |
| 8,718,333 B2 | 5/2014 | Wolf et al. | |

(56) References Cited

U.S. PATENT DOCUMENTS

| | | |
|---|---|---|
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell et al. |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1* | 3/2007 | Panje .................. 702/181 |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Nguyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1* | 8/2008 | Anderton et al. ............ 705/14 |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |

(56) References Cited

U.S. PATENT DOCUMENTS

| | | |
|---|---|---|
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0063992 A1 | 3/2009 | Gandhi et al. |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind et al. |
| 2009/0132341 A1 | 5/2009 | Klinger et al. |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collison |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0150978 A1 | 1/2012 | Monaco |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |

(56) References Cited

U.S. PATENT DOCUMENTS

| | | |
|---|---|---|
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Bray et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0008238 A1 | 1/2013 | Hogeg et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0103766 A1 | 4/2013 | Gupta |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1* | 6/2013 | Rajaram et al. ........... 705/14.66 |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1* | 4/2014 | Anderson ......... H04M 1/72569 |
| | | 345/632 |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143064 A1 | 5/2014 | Tran |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1* | 9/2014 | O'Keefe et al. ........... 455/456.3 |
| 2014/0289833 A1 | 9/2014 | Briceno |
| 2014/0306986 A1* | 10/2014 | Gottesman et al. .......... 345/619 |
| 2014/0317302 A1 | 10/2014 | Naik |
| 2014/0324627 A1* | 10/2014 | Haver ................ G06Q 30/0639 |
| | | 705/26.9 |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1* | 4/2015 | Leydon ................ G06F 3/0236 |
| | | 704/9 |
| 2015/0096042 A1* | 4/2015 | Mizrachi ................ H04L 51/34 |
| | | 726/26 |
| 2015/0116529 A1 | 4/2015 | Wu et al. |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0287006 A1 | 10/2017 | Azmoodeh et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |

(56) References Cited

FOREIGN PATENT DOCUMENTS

| WO | WO-2001029642 A1 | 4/2001 |
|---|---|---|
| WO | WO-2001050703 A3 | 7/2001 |
| WO | WO-2006118755 A2 | 11/2006 |
| WO | WO-2007092668 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 | 1/2013 |
| WO | WO-2013045753 A1 | 4/2013 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

"International Application Serial No. PCT/US2015/050424, Written Opinion dated Dec. 4, 2015", 10 pgs.
"A Whole New Story", [Online]. Retrieved from the Internet: <https://www.snap.com/en-US/news/>, (2017), 13 pgs.
"Adding a watermark to your photos", eBay, [Online]. Retrieved from the Internet:<URL:http://pages.ebay.com/help/sell/pictures.html>, (accessed May 24, 2017), 4 pgs.
"U.S. Appl. No. 14/548,590, Response filed May 9, 2017 to Non Final Office Action dated Jan. 9, 2017", 17 pgs.
"BlogStomp" [Online]. Retrieved from the Internet: <URL:http://stompsoftware.com/blogstomp>, (accessed May 24, 2017), 12 pgs.
"Cup Magic Starbucks Holiday Red Cups come to life with AR app", [Online]. Retrieved from the Internet: <http://www.blastradius.com/work/cup-magic>, (2016), 7 pgs.
"Daily App: InstaPlace (iOS/Android): Give Pictures a Sense of Place", TechPP, [Online]. Retrieved from the Internet: <URL;http://techpp.com/2013/02/15/instaplace-app-review>, (2013), 13 pgs.
"InstaPlace Photo App Tell The Whole Story", [Online]. Retrieved from the Internet; <https://youtu.be/uF_gFkg1hBM>, (Nov. 8, 2013), 113 pgs.
"International Application Serical No. PCT/US 2015/037251, International Search Report dated Sep. 29, 2015", 7 pgs.
"Introducing Snapchat Stories", [Online]. Retrieved from the Internet:<https://www.youtube.com/watch?v=88Cu3yN-LIM>, (Oct. 3, 2013), 92 pgs.
"Macy's Believe-o-Magic", {Online}. Retrieved from the Internet: <https://www.youtube.com/watch?v=xvzRXy3J0Z0>, (Nov. 7, 2011), 102 pgs.
"Macy's Introduces Augmented Reality Experience in Stores across Country as Part of Its 2011 "Believe" Campaign", [Online]. Retrieved from the Internet: <http://www.businesswire.com/news/home/20111102006759/en/Macy%E2%80%99s-Introduces-Augmented-Reality-Experience-Stores-Country>., (Nov. 2, 2011), 6 pgs.
"Starbucks Cup Magic", {Onlilne}. Retrieved from the Internet: <https://www.youtube.com/watch?v=RWwQXi9RG0w>, (Nov. 8, 2011), 87 pgs.
"Starbucks Cup Magic for Valentine's Day", {Online}. Retrieved from the Internet <https://www.youtube.com/watch?v=8nvqOzjq10w>, (Feb. 6, 2012), 88 pgs.
"Starbucks Holiday Red Cups Come to Life, Signaling the Return of the Merriest Season", [Online]. Retrieved from the Internet: <http://www.businesswire.com/news/home/20111115005744/en/2479513/Starbucks-Holiday-Red-Cups-Life-Signaling-Return>, (Nov. 15, 2011), 5 pgs.
Carthy, Roi, "Dear All Photo Apps: Mobli Just Won Filters", [Online]. Retrieved from the Internet: URL<https://techcrunch.com/2011/09/08lmobli-filters>, (Sep. 8, 2011), 10 pgs.

Janthong; Isaranu, "Android App Review Thailand", [Online]. Retrieved from the Internet:<http://www.android-free-app-review.com/2013/01/instaplace-android-googie-play-store.html>, (Jan. 23, 2013), 9 pgs.
Macleod, Duncan, "Macys Believe-o-Magic App", [Online], Retrieved from the Internet: <URL:http://theinspirationroom.com/daily/2011/macys-believe-o-magic-app>, (Nov. 14, 2011), 10 pgs.
Macleod, Duncan, "Starbucks Cup Magic—Let's Merry", {Online}. Retrieved from the Internet: <URL; http://theinspirationroom.com/daily/2011/starbucks-cup-magic>, (Nov. 12, 2011), 8 pgs.
Notopoulos, Katie, "A Guide to the New Snapchat Filters and Big Fonts", [Online]. Retrieved from the Internet:<https://www.buzzfeed.com/katienotopoulos/a-guide-to-the-new-snapchat-filters-and-big-fonts?utm_term=.bkQ9qVZW#.nv58YXpkV>, (Dec. 22, 2013), 13 pgs.
Panzarino, Matthew, "Snapchat Adds Filters, A Replay Function and for Whatever Reason, Time, Temperature and Speed Overlays", [Online]. Retrieved from the Internet: <https://techcrunch.com/2013/12/20/snapchat-adds-filters-new-font-and-for-some-reason-time-temperature-and-speed-overlays/>, (Dec. 20, 2013), 12 pgs.
Tripathi, Rohit, "Watermark Images in PHP and Save File on Server", [Online]. Retrieved from the Internet: <URL:http://code.rohitink.com/2012/12/28/watermark-images-in-php-and-save-file-on-server/, (Dec. 28, 2012), 4 pgs.
"U.S. Appl. No. 14/494,226, Examiner Interview Summary dated Oct. 27, 2016", 3 pgs.
"U.S. Appl. No. 14/494,226, Final Office Action dated Mar. 7, 2017", 34 pgs.
"U.S. Appl. No. 14/494,226, Non Final Office Action dated Sep. 12, 2016", 32 pgs.
"U.S. Appl. 14/494,226, Response filed Dec. 12, 2016 to Non Final Office Action dated Sep. 12, 2016", 16 pgs.
"How Snaps Are Stored and Deleted", Snapchat, [Online]. Retrieved from the Internet: <URL: https://web.archive.org/web/20130607042322/http://blog.snapchat.com/post/50060403002/how-snaps-are-stored-and-deleted, (May 9, 2013), 2 pgs.
"International Application Serial No. PCT/US2014/040346, International Search Report dated Mar. 23, 2015", 2 pgs.
"Intereenational Application Serial No. PCT/US2014/040346, Written Opinion dated Mar. 23, 2015", 6 pgs.
"International Application Serial No. PCT/US2015/050424, International Preliminary Report on Patentability dated Mar. 30, 2017", 12 pgs.
"iVisit Mobile Getting Started", IVIST, (Dec. 4, 2013), 1-16.
Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.
Melanson, Mike, "This text message will self destruct in 60 seconds", readwrite.com, [Online]. Retrieved from the Internet: <http://readwrite.com/2011/02/11/this_text_message_will_self_destruct_in_60_seconds, (Feb. 18, 2015).
Sawers, Paul, "Snapchat for iOS Lets You Send Photos to Friends and Set How long They're Visible for", [Online]. Retrieved from the Internet: <http://thenextweb.com/apps/2012/05/07/Snapchat-for-ios-lets-you-send-photos-to-friends-and-set-how-long-theyre-visiblefor/#! xCjrp>,, (May 7, 2012), 1-5.
Shein, Esther, "Ephemeral Data", Communications of the ACM vol. 56 | No. 9, (Sep. 2013), 20-22.
"U.S. Appl. No. 14/494,226, Appeal Brief filed Mar. 1, 2019 in response to Final Office Action dated Jun. 1, 2018", 29 pgs.
"U.S. Appl. No. 14/494,226, Examiner Interview Summary dated Dec. 20, 2017", 2 pgs.
"U.S. Appl. No. 14/494,226, Final Office Action dated Jun. 1, 2018", 33 pgs.
"U.S. Appl. No. 14/494,226, Non Final Office Action dated Sep. 7, 2017", 36 pgs.
"U.S. Appl. No. 14/494,226, Response filed Jan. 8, 2018 to Non Final Office Action dated Sep. 7, 2017", 15 pgs.
"U.S. Appl. No. 14/494,226, Response filed Jul. 7, 2017 to Final Office Action dated Mar. 7, 17", 13 pgs.
"European Application Serial No. 15841735.2, Communication Pursuant to Article 94(3) EPC dated Jan. 17, 2019", 7 pgs.

(56) References Cited

OTHER PUBLICATIONS

"European Application Serial No. 15841735.2, Extended European Search Report dated Feb. 12, 2018", 9 pgs.

Taylor Lorenz, "Snapchat revealsTaylor geofilters that can only be unlocked in the right place", Daily Mail Online, [Online] Retrieved from the Internet : <http://www.dailymail.co.uk/sciencetech/article-2693196/Snapchat-introduces-location-specific-Geofilters.html>, (Jul. 17, 2014).

U.S. Appl. No. 14/494,226, filed Sep. 23, 2014, User Interface to Augment an Image Using Geolocation.

* cited by examiner

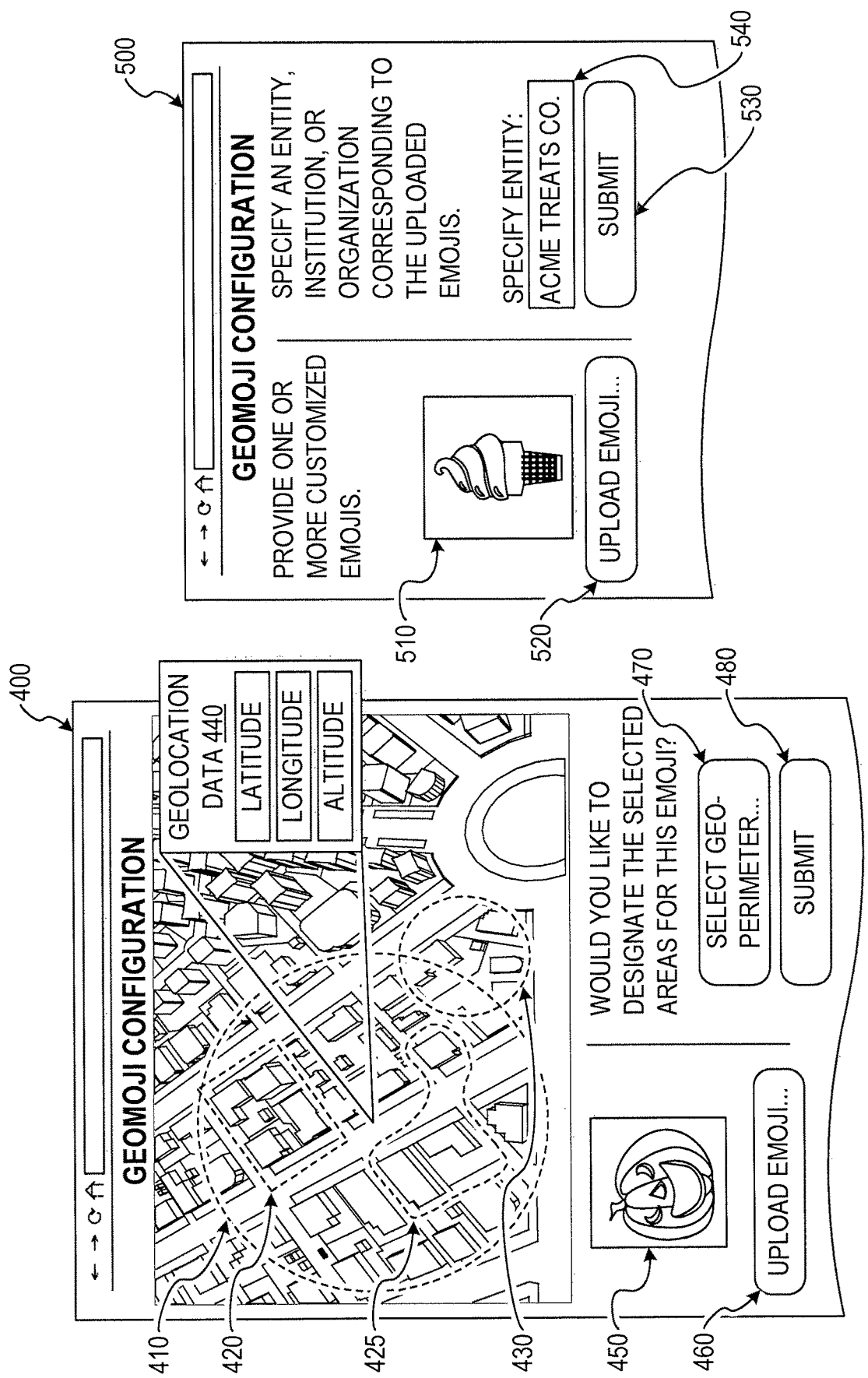

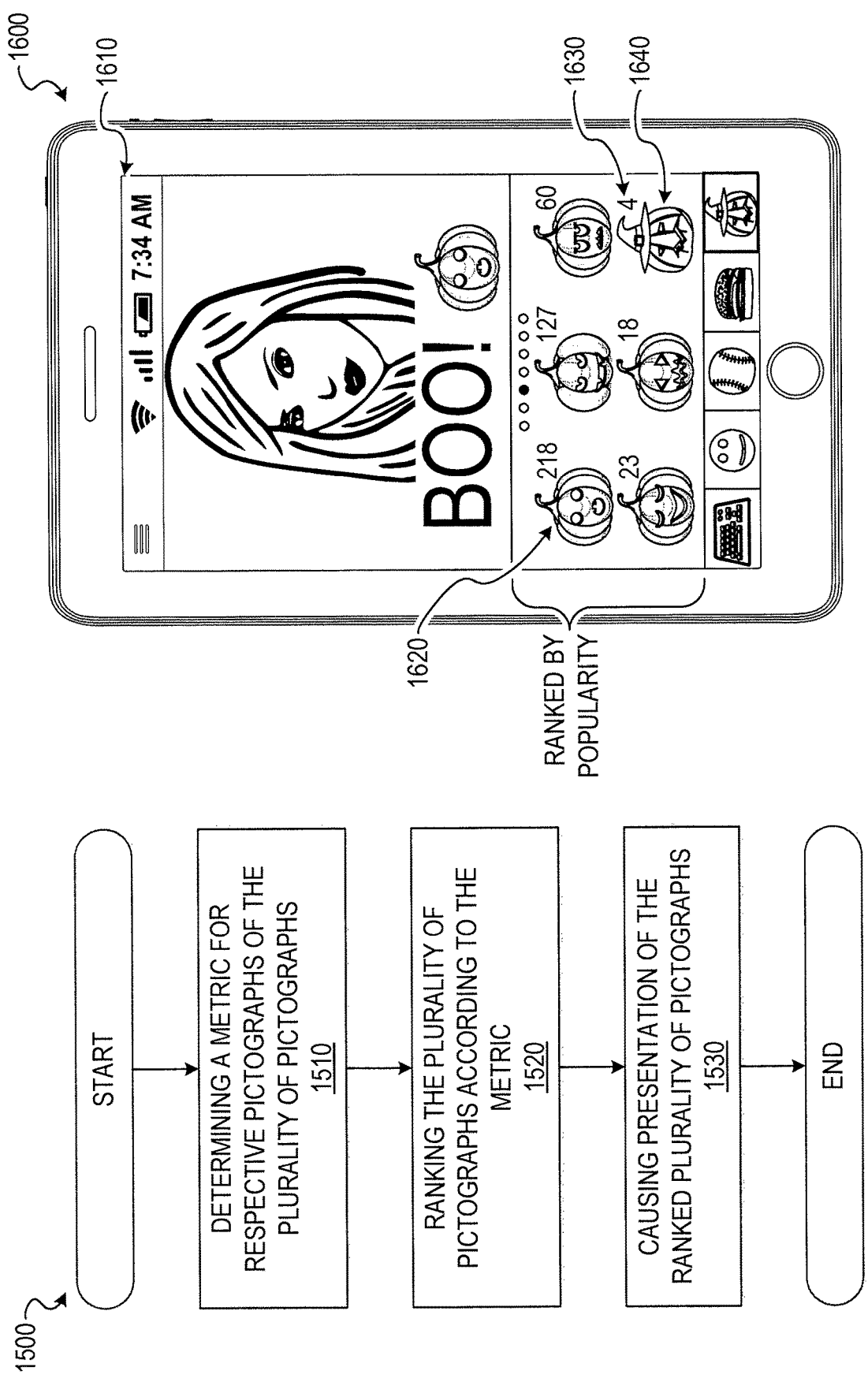

GEOLOCATION-BASED PICTOGRAPHS

RELATED APPLICATIONS

This application claims the priority benefit of U.S. Provisional Application No. 62/052,405, entitled "GEOLOCATION-BASED PICTOGRAPHS," filed Sep. 18, 2014, which is hereby incorporated by reference in its entirety.

TECHNICAL FIELD

Embodiments of the present disclosure relate generally to mobile computing technology and, more particularly, but not by way of limitation, to geolocation-based pictographs.

BACKGROUND

Emojis are a popular form of expression in digital communications. As a result of this popularity, there is an ever-increasing variety of emojis for countless expressions. Choosing a particular emoji among such a variety can become challenging for users. Selecting an emoji from a static list that provides an overwhelming number of choices can be a slow and frustrating experience for users.

BRIEF DESCRIPTION OF THE DRAWINGS

Various ones of the appended drawings merely illustrate example embodiments of the present disclosure and should not be considered as limiting its scope.

FIGS. 4 and 5 illustrate example user interfaces configured to receive geolocation-based pictograph configuration data, according to some example embodiments.

FIG. 15 is a flow diagram illustrating an example method for causing presentation of a plurality of pictographs based on a metric, according to some example embodiments.

FIG. 16 illustrates an example user interface that includes pictographs presented based on a metric, according to some example embodiments.

Figure 1:
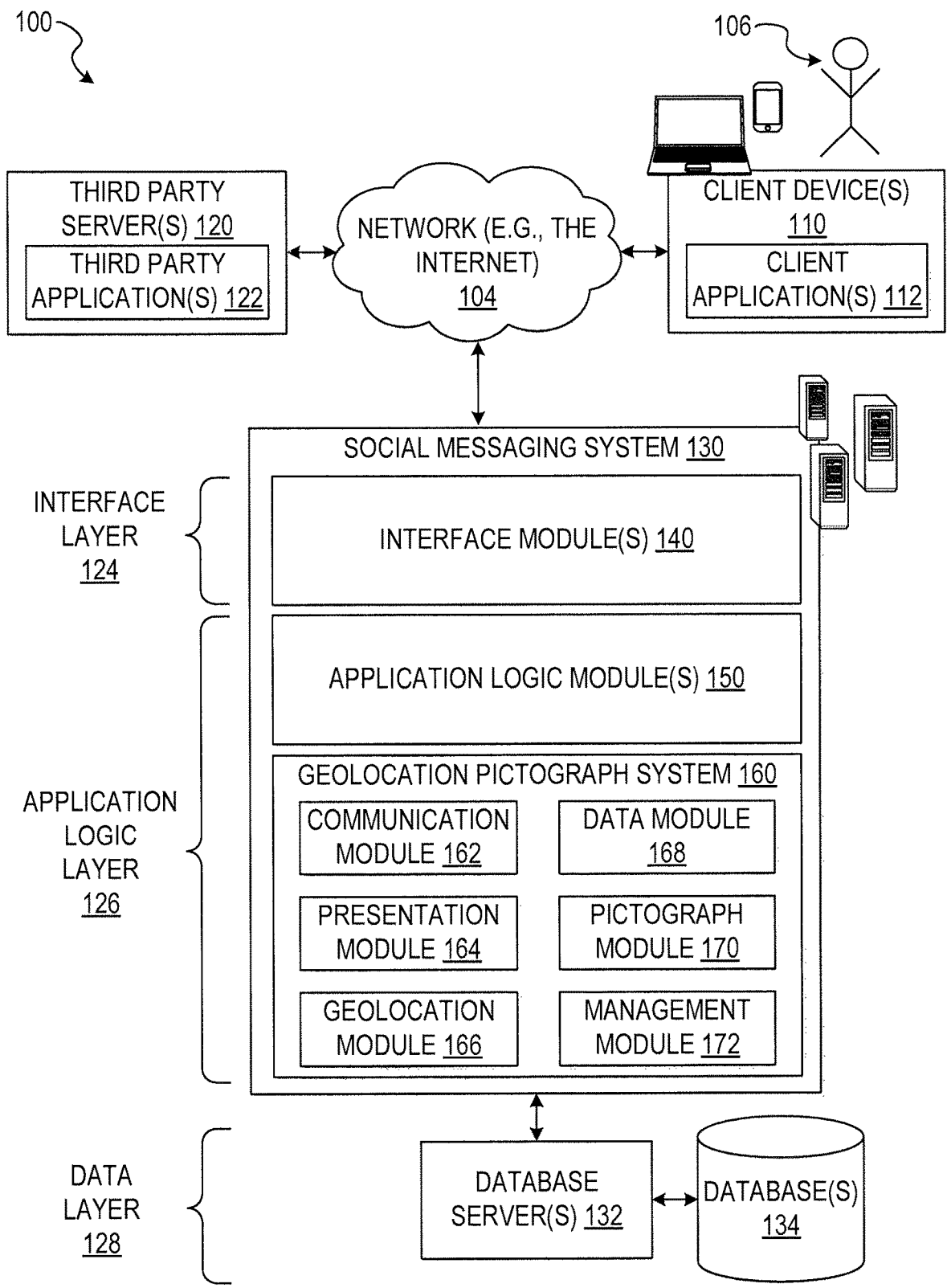
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Person to person communication via text-based messages (which, for purposes of the examples described herein, can include video or image-based messages) can often lead to miscommunication as gestures, vocal intonation, facial expressions, and body language are absent from such communications. For instance, a recipient of a text-based communication can misinterpret or inject an emotional connotation perhaps not intended by a sender of the communication (e.g., a sarcastic message being interpreted as terse). Emoticons (also referred to as emojis) are expressive images, ideograms, or pictographs used to convey an emotion or other connotation in association with a variety of communications. Emojis are increasingly being used in text-based communication mediums to enhance and supplement text-based communication. In some instances, emojis are used to promote products or services (e.g., an emoji that references or alludes to a product or service). As there are a vast number of emojis for a wide spectrum of expressions, selecting a suitable emoji for a particular occasion or to convey a particular sentiment can be difficult. Current embodiments contemplate the use of emojis in any form of visual communication or message, including, e.g., video or picture-based communications. For example, any of the current concepts may be utilized with or added as annotations or overlays to an image, picture or video.

To assist a user in identifying a suitable emoji or to provide the user access to an exclusive emoji, in various embodiments, pictographs are identified (i.e., selected from a predetermined list) based on a current geolocation of a user device (herein, geolocation-based emojis are also referred to as geomojis). In an embodiment, a third party entity (e.g., a company, organization, or individual) configures a geomoji by providing a custom pictograph, a geographic indication (described below), and other geomoji configuration data (e.g., rules or criteria for providing access to or restricting access from a particular geomoji). For example, the third party entity generates a custom pictograph (e.g., a graphical symbol or animation) and provides a geographic indication corresponding to the custom pictograph. The geographic indication comprises a particular geolocation, geo-fence parameters (virtual boundaries or perimeters corresponding to a physical geographic location), or other geographic indicators.

In a specific example, a local coffee shop creates a custom pictograph that illustrates their products or services (e.g., an image of a coffee mug including the local coffee shop logo or an animation of steam rising from a coffee mug). The local coffee shop uploads or submits the custom pictograph along with the geographic indication (e.g., a specified geolocation that is a real-world physical location of the local coffee shop) to a geolocation pictograph system.

Once the geomoji is configured by the third party entity (e.g., the local coffee shop), a user (e.g., a coffee shop patron) may access the geomoji in the following manner. The user device sends in real time a request for a relevant pictograph to a geomoji server. The request includes a current geolocation of the user device (e.g., as determined by a Global Positioning System (GPS) component of the mobile device). In response to the request, the geomoji server identifies the custom pictograph (e.g., the coffee mug including the local coffee shop logo) based on the current geolocation of the user device and the geographic indication (in this example, a specified geolocation provided by the local coffee shop). For instance, if the current geolocation of the user device is within a distance of the specified geolocation provided by the third party entity, the geomoji server communicates the custom pictograph to the user device or the user device is otherwise provided access to the custom pictograph (e.g., the custom pictograph is stored on the user device). Subsequently, the user device presents the custom pictograph on a user interface of the user device. For example, the user device includes, inserts, or embeds the custom pictograph into a virtual keyboard of the user device allowing the user of the user device to select the custom pictograph for a particular communication.

In some embodiments, the virtual keyboard is a portable virtual keyboard that can be used by third party applications of the user device. For instance, the portable virtual keyboard replaces or is an alternative to the default system keyboard of the user device and can be used in conjunction with the third party applications or system applications of the user device. In other words, the portable virtual keyboard can operate alongside third party applications of the user device and the third party applications can receive or access input generated at the portable virtual keyboard for use within the third party applications. The portable virtual keyboard can include standard text inputs (e.g., alphanumeric characters) and the custom pictograph of a particular geomoji. In this way, the third party applications of the user device can receive, access, or otherwise use geomojis via the portable virtual keyboard.

In some situations, the third party entity providing one or more specified geolocations for the custom pictograph can be difficult if there are many geolocations for the custom pictograph. Another difficulty that can arise is the specified geolocation becoming outdated (e.g., a business changes location). This particular difficulty can become more pronounced when dealing with a large number of geolocations such as in a situation with a particular geomoji for a large franchise with many locations.

To mitigate these difficulties, consistent with some embodiments, the third party entity can provide the geographic indication that includes a geo-identifier other than a particular geolocation. For example, the geographic indication can include a specified entity name (e.g., a business name), a specified geolocation type (e.g., a historical landmark, a soccer field, or an educational institution), or another geo-identifier operable to identify a particular geolocation. In these embodiments, a geospatial data service, hosted by the geomoji server or a third party server (e.g., a third party server that maintains a frequently updated geospatial database), provides information in response to a geolocation-based query. For instance, the geomoji server or the user device queries the geospatial data service for information corresponding to the current geolocation of the user device. The geospatial data service provides information such as an entity name, a geolocation type, or other information corresponding to the current geolocation. The geomoji server compares the information provided by the geospatial data service with the geographic indication to identify the custom pictograph.

In a specific example, a large coffee shop franchise (e.g., STARBUCKS®), with thousands of locations, configures a geomoji with the geographic indication including the specified entity name. The geomoji server or the user device sends a geolocation-based query for a current entity name corresponding to the current geolocation of the user device to a third party server (e.g., a geospatial data service provided by a third party). After the third party server identifies the current entity name corresponding to the current location, the geomoji server matches the current entity name with the specified entity name to identify the custom pictograph.

These embodiments are similar to those described above regarding the geographic indication including the specified geolocation, but an intermediate identifier is employed to identify the custom pictograph based on the current geolocation. In this way, the third party entity can configure geomojis without explicitly providing geolocation data in the geomoji configuration data. This can be useful in situations where there are hundreds or thousands of geolocations corresponding to a particular entity and the same pictographs are to correspond to each of the geolocations. In further embodiments, a combination of different geographic indications can be used to identify one or more pictographs associated with the current geolocation.

FIG. 1 is a network diagram depicting a network system 100 having a client-server architecture configured for exchanging data over a network, according to one embodiment. For example, the network system 100 may be a messaging system where clients may communicate and exchange data within the network system 100. The data may pertain to various functions (e.g., sending and receiving text and media communication, determining geolocation, etc.)

and aspects (e.g., publication of geomojis, management of geomojis, etc.) associated with the network system 100 and its users. Although illustrated herein as client-server architecture, other embodiments may include other network architectures, such as peer-to-peer or distributed network environments.

As shown in FIG. 1, the network system 100 may include a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. Of course, additional functional modules and engines may be used with a social messaging system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although the social messaging system 130 is depicted in FIG. 1 as a three-tiered architecture, the inventive subject matter is by no means limited to such an architecture.

As shown in FIG. 1, the interface layer 124 consists of interface module(s) (e.g., a web server) 140, which receives requests from various client-computing devices and servers, such as client device(s) 110 executing client application(s) 112, and third party server(s) 120 executing third party application(s) 122. In response to received requests, the interface module(s) 140 communicates appropriate responses to requesting devices via a network 104. For example, the interface module(s) 140 can receive requests such as Hypertext Transfer Protocol (HTTP) requests, or other web-based, Application Programming Interface (API) requests.

The client device(s) 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). In an example, the client device(s) 110 are executing the client application(s) 112. The client application(s) 112 can provide functionality to present information to a user 106 and communicate via the network 104 to exchange information with the social messaging system 130. Each of the client device(s) 110 can comprise a computing device that includes at least a display and communication capabilities with the network 104 to access the social messaging system 130. The client device(s) 110 comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more user(s) 106 can be a person, a machine, or other means of interacting with the client device(s) 110. In some embodiments, the user(s) 106 interact with the social messaging system 130 via the client device(s) 110. The user(s) 106 may not be part of the networked environment, but may be associated with the client device(s) 110.

As shown in FIG. 1, the data layer 128 has one or more database server(s) 132 that facilitate access to one or more information storage repositories or database(s) 134. The database(s) 134 are storage devices that store data such as member profile data, social graph data (e.g., relationships between members of the social messaging system 130), and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic module(s) 150, which, in conjunction with the interface module(s) 140, generate various user interfaces with data retrieved from various data sources or data services in the data layer 128. Individual application logic module(s) 150 may be used to implement the functionality associated with various applications, services, and features of the social messaging system 130. For instance, a social messaging application can be implemented with one or more of the application logic module(s) 150. The social messaging application provides a messaging mechanism for users of the client device(s) 110 to send and receive messages that include text and media content such as pictures and video. The client device(s) 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application server module(s) 150.

As illustrated in FIG. 1, the social messaging system 130 includes a geolocation pictograph system 160. In various embodiments, the geolocation pictograph system 160 can be implemented as a standalone system and is not necessarily included in the social messaging system 130. The geolocation pictograph system 160 is shown to include a communication module 162, a presentation module 164, a geolocation module 166, a data module 168, a pictograph module 170, and a management module 172. All, or some, of the modules 162-172, communicate with each other, for example, via a network coupling, shared memory, and the like. Each module of modules 162-172 can be implemented as a single module, combined into other modules, or further subdivided into multiple modules. Other modules not pertinent to example embodiments can also be included, but are not shown.

The communication module 162 provides various communications functionality. For example, the communication module 162 receives configuration data for geomojis, such as pictograph data (e.g., an image file) and geographic indications (e.g., a particular latitude and longitude). The communication module 162 exchanges network communications with the database server(s) 132, the client device(s) 110, and the third party server(s) 120. The information retrieved by the communication module 162 includes data associated with the user (e.g., member profile data from an online account or social network service data) or other data to facilitate the functionality described herein.

The presentation module 164 provides various presentation and user interface functionality operable to interactively present and receive information to and from the user. For instance, the presentation module 164 can cause presentation of one or more pictographs on a user interface or in a display of a user device (e.g., include the one or more pictographs in a virtual keyboard user interface of the user device). In various embodiments, the presentation module 164 presents or causes presentation of information (e.g., visually displaying information on a screen, acoustic output, haptic feedback). Interactively presenting information is intended to include the exchange of information between a particular device and the user. The user may provide input to interact with the user interface in many possible manners, such as alphanumeric, point based (e.g., cursor), tactile, or other input (e.g., touch screen, tactile sensor, light sensor, infrared sensor, biometric sensor, microphone, gyroscope, accelerometer, or other sensors), and the like. The presentation module 164 provides many other user interfaces to facilitate functionality described herein. The term "presenting" as used herein is intended to include communicating information or instructions to a particular device that is operable to perform presentation based on the communicated information or instructions.

In various embodiments, the presentation module 164 generates and manages a portable virtual keyboard that can be used in conjunction with various third party applications of the user device. "Third party applications," as used herein, are intended to include applications developed and provided by entities other than a provider or developer of the geolocation pictograph system 160. For example, the third party applications can include system applications (e.g., a text messaging application or note taking application pre-installed on the user device) or applications downloaded from an application store (e.g., GOOGLE® PLAY, APP STORE, or WINDOWS® STORE). In some embodiments, the user of the user device provides permission or otherwise enables the portable virtual keyboard to access various user device preferences, settings, data, or other features (e.g., allowing access to geolocation services of the user device).

The geolocation module 166 provides location services functionality such as receiving or determining the current geolocation of the client device(s) 110 in real time. The client device(s) 110 include position components such as location sensors (e.g., a GPS receiver component), altitude sensors (e.g., altimeters or barometers that detect air pressure, from which altitude can be derived), orientation sensors (e.g., magnetometers that provide magnetic field strength along the x, y, and z axes), and the like. The position components can provide data such as latitude, longitude, altitude, and a time stamp at a regular update rate (e.g., a sampling rate). The geolocation module 166 receives, monitors, or otherwise obtains geolocation data from the position components of the client device(s) 110. In other embodiments, the geolocation module 166 obtains or derives geolocation data of the client device(s) 110 using other location services such as Internet Protocol (IP) geolocation, WI-FI® signal triangulation, BLUETOOTH® beacon signal detections that can indicate a particular location, and so forth.

The term "real-time data," as used herein, is intended to include data associated with an event currently happening. For example, the geolocation module 166 receiving the current geolocation of the client device(s) 110 in real time includes a particular geolocation detected at the client device(s) 110 after a delay interval (e.g., due to transmission delay or other delays such as data being temporarily stored at an intermediate device). Thus, in some instances, receiving the current geolocation in real time is intended to include geolocations of the client device(s) 110 from the past. This discussion of real time applies equally throughout the specification in relation to other uses of the term "real time."

The data module 168 provides various data functionality such as exchanging information with databases or servers. For example, the data module 168 accesses member profiles of the social messaging system 130 that include profile data from the database(s) 134 (e.g., social graph data of the user that indicates contact members of the user on the social messaging system 130 or another social messaging service). In another example, the data module 168 stores a user preference, a user setting, or other user data in the databases(s) 134. In some embodiments, the data module 168 exchanges information with the third party server(s) 120, the client device(s) 110, or other sources of information.

The pictograph module 170 provides functionality to identify one or more pictographs based on a geographic indication. For example, the pictograph module 170 identifies a pictograph by comparing a current geolocation of the client device(s) 110 to a specified geolocation corresponding to a pictograph. In this example, if the pictograph module 170 determines that the current geolocation of the client device(s) 110 is within a distance or within a perimeter (examples could include a city block, neighborhood, college campus, office complex, individual buildings, parks, and/or any regular or irregularly shaped area) of the specified geolocation, the pictograph module 170 identifies the pictograph corresponding to the specified geolocation.

The management module 172 provides functionality for third party entities to submit geomojis. For example, the third party entities can submit geomoji configuration data to the management module 172 by inputting geomoji configuration data into a user interface configured to receive the geomoji configuration data. The management module 172 further allows the third party entities to submit a custom pictograph and the geographic indication corresponding to the custom pictograph, provide rules and criteria associated with the custom pictograph, make payments for use of the geolocation pictograph system 160, receive payments for revenue resulting from the custom pictographs submitted to the geolocation pictograph system 160, and so forth.

Figure 2:
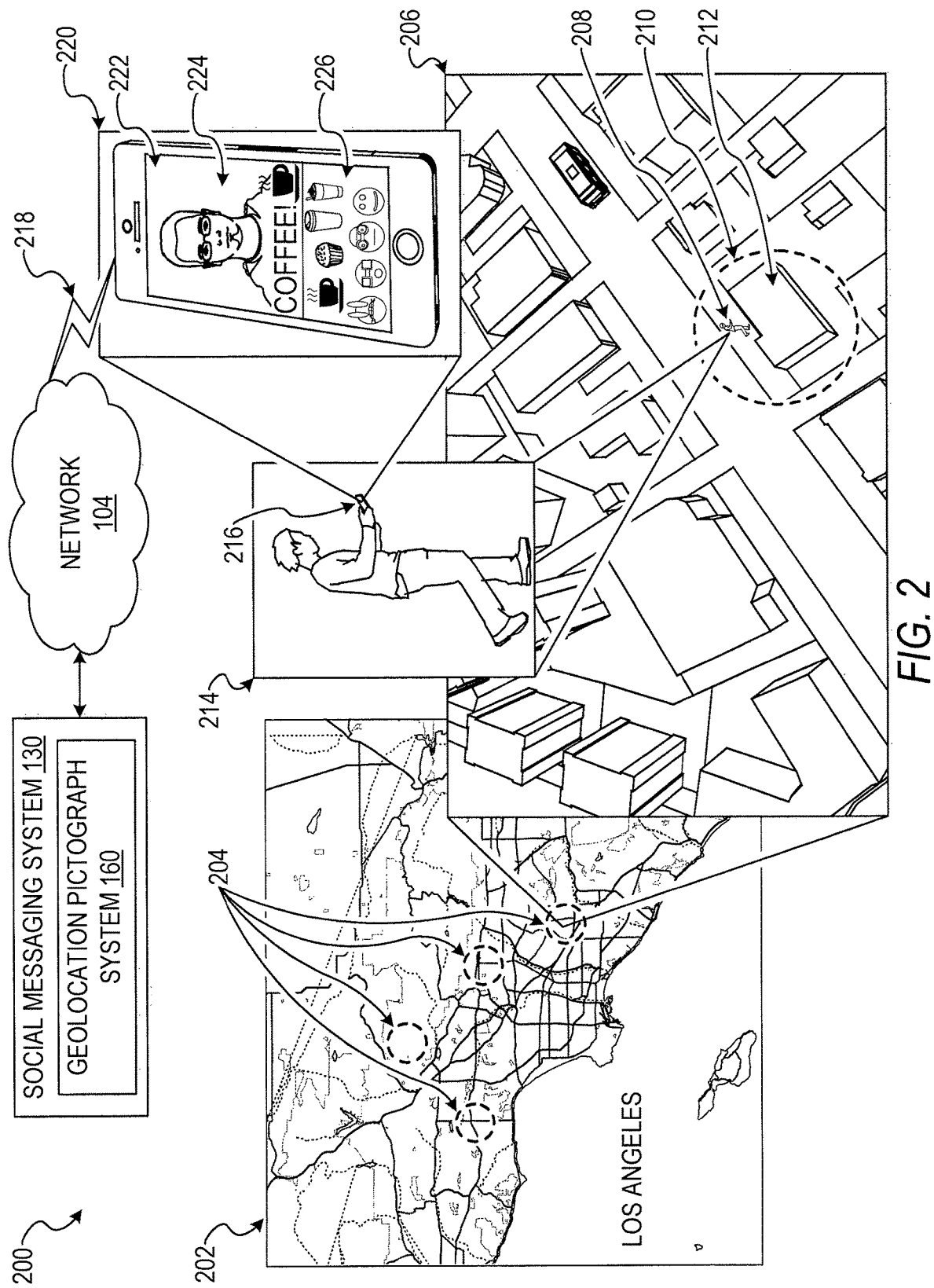
FIG. 2 is a diagram illustrating an example of providing pictographs based on a geographic indication, according to some example embodiments.

Referring now to FIG. 2, a diagram 200 illustrating an example of the geolocation pictograph system 160 providing pictographs corresponding to a current geolocation of a user device (e.g., the client device(s) 110) is shown. In the diagram 200, a map 202 represents a particular geographic area, such as Los Angeles. Geo-fences 204 are virtual boundaries or perimeters corresponding to physical geographic locations. A third party entity (e.g., a company, organization, or individual) provides geomoji configuration data, such as a particular geolocation, a pictograph for the particular geolocation, and other configuration data (e.g., rules or criteria such as a specifying a perimeter surrounding the particular geolocation) to the management module 172. In the example of the diagram 200, the geo-fences 204 are specified by the third party entity and correspond to specified pictographs. The geomoji configuration data is received at the management module 172 or the communication module 162 and stored by the data module 168 (e.g., in database(s) 134) for subsequent access.

A scene 206 illustrates an enlarged view of a particular geolocation represented in the map 202. The scene 206 includes a user 208, a geo-fence 210, and a merchant store 212. In the example of the diagram 200, the user 208 is going to the merchant store 212. As shown in a scene 214, the user 208 is operating a user device 216 (e.g., a geolocation enabled smart phone). As further illustrated in a scene 220, the user device 216 is displaying a user interface 222 including a message 224 and one or more pictographs 226. The user device 216 is communicatively coupled to the network 104 and the social messaging system 130 via a communication link 218 allowing for exchange of data between the geolocation pictograph system 160 and the user device 216.

The user device 216 may operatively detect the current geolocation via a positioning component such as a GPS component of the user device 216. The user device 216 periodically communicates geolocation data, as determined by the positioning component, to the geolocation pictograph system 160, to be received at the geolocation module 166, via the network 104. When the user device 216 is within the geo-fence 210, the pictograph module 170 of the geolocation pictograph system 160 identifies the custom pictograph corresponding to the geo-fence 210 as specified by the geomoji configuration data provided by the third party entity. That is to say, the pictograph module 170 provides the user device 216 with access to the custom pictograph corresponding to the geo-fence 210 when the pictograph module 170 determines that the user device 216 is within the geo-fence 210 perimeter.

In a specific example, the merchant store 212 is a coffee shop and the user 208 is a patron of the coffee shop. In this example, the user 208 is stopping by the coffee shop and wants to share the experience with contacts (e.g., friends or followers) on the social messaging system 130. The user 208 captures an image or video (e.g., via an image sensor of the user device) and composes the message 224 using a social messaging application executing on the user device 216 (e.g., SNAPCHAT®). The geolocation pictograph system 160 receives the current geolocation of the user device 216 and identifies the one or more pictographs 226 associated with the current geolocation. The merchant store 212 previously provided the geolocation pictograph system 160 with the custom pictograph (e.g., an image featuring a product or service of the merchant store 212) and specified the geo-fence 210 surrounding the physical location of the merchant store 212. Once the geolocation pictograph system 160 identifies the one or more pictographs 226, the presentation module 164 causes presentation of the one or more pictographs 226 and other pictographs on the user interface 222 of the user device 216. For example, the one or more pictographs 226 are inserted into a virtual keyboard of the user interface 222. Subsequently, the user 208 can select at least one of the one or more pictographs 226 to be included in the message 224.

The user can then cause transmission of the message, including the at least one selected pictographs, to one or more message recipients who can view the message and the at least one selected pictographs. In some embodiments, pictographs included in the message 224 are image assets that are transmitted along with contents of the message 224. In other embodiments, the pictograph included in the message 224 is a character code that a recipient device uses to identify the pictograph included in the message 224 when the message 224 is received (e.g., the pictograph is stored on the recipient device prior to receipt of the message 224 or is accessible to the recipient device upon receipt of the message 224).

Figure 3:
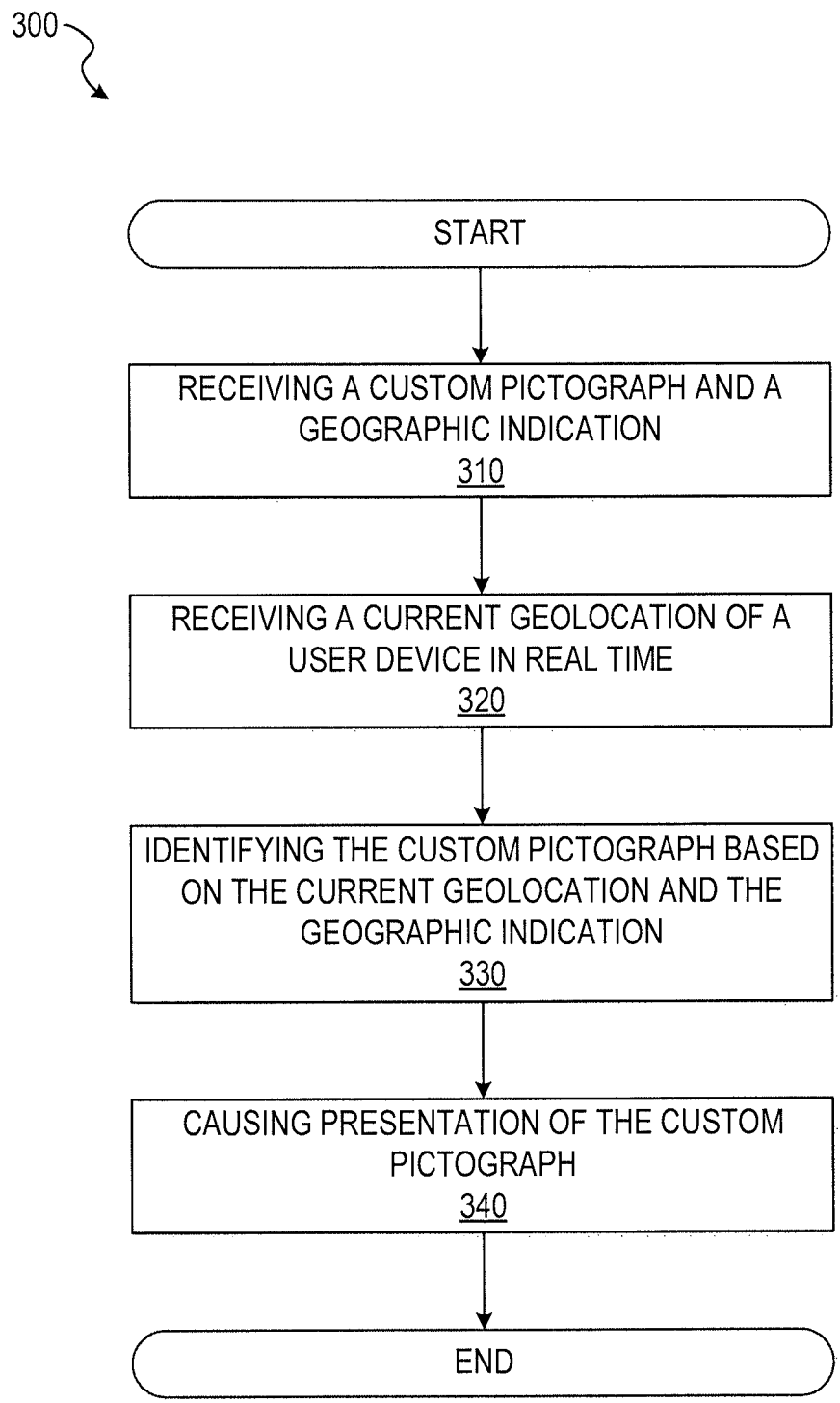
FIG. 3 is a flow diagram illustrating an example method for identifying and causing presentation of a pictograph based on a geographic indication, according to some example embodiments.

FIG. 3 is a flow diagram illustrating an example method 300 for identifying and causing presentation of pictographs based on a geolocation. The operations of the method 300 may be performed by components of the geolocation pictograph system 160, and are so described below for the purposes of illustration.

At operation 310, the communication module 162 or the management module 172 receives the custom pictograph and the geographic indication. The third party entity (e.g., a company, organization, or individual) may provide geomoji configuration data such as a particular geolocation, the custom pictograph for the particular geolocation, and other configuration data (e.g., rules or criteria such as a specifying a perimeter surrounding the particular geolocation). A host of the geolocation pictograph system 160 may also provide geomoji configuration data, as well as the third party entity.

Referring now to FIG. 4, an example user interface 400 configured to receive geomoji configuration data is illustrated. The third party entity inputs the geomoji configuration data into the user interface 400 at a configuration device (e.g., a computer or mobile device of the third party entity). The user interface 400 is configured to receive geolocations and geolocation parameters such as a specified perimeter surrounding a particular geolocation. For instance, when the third party entity activates a user interface element 470, the third party entity can specify geo-fences 410, 420, 425, and 430. In a specific example, the third party entity provides geolocation data 440 and a radius to define the geo-fence 410. In other examples, the third party entity inputs a polygon (e.g., the geo-fence 420) defined with points that are geolocations or an irregular shape (e.g., the geo-fence 425). Although not shown in FIG. 4, the third party entity can define geo-fences with three-dimensional geometries (e.g., using latitude, longitude, and altitude). Thus, using altitude information, a geo-fence could be implemented to cover a particular floor(s) in a building. As shown in the user interface 400, geo-fences can overlap and be inside of one another. In some embodiments, the geographic indication is an area, a city, a region, a state, a country, and so forth. The geomoji configuration data can include a wide variety of statically defined geo-fences and dynamically defined geo-fences.

The user interface 400 is also configured to receive the custom pictograph generated by the third party entity. For example, a pictograph 450 is uploaded to the geolocation pictograph system 160, received at the communication module 162 or the management module 172, and stored by the data module 168 (e.g., stored in database(s) 134) when the user activates a user interface element 460. Although the user interface 400 shows one pictograph, the third party entity can specify multiple pictographs for a particular geolocation or a particular geo-fence.

In further embodiments, the geomoji configuration data includes geomoji rules or geomoji criteria, specified by the third party entity, corresponding to the custom pictograph. In some instances, the purpose of the geomoji criteria is to create an exclusive pictograph that is available to users that meet the geomoji criteria. In an example, the geomoji criteria include a criterion based on a user action to be taken by the user to access the custom pictograph. For example, the user action includes scanning a particular RFID tag or QR code, lingering near a particular geolocation (e.g., within a specified or dynamically determined vicinity of the particular geolocation) for a specified period of time, scanning a barcode of a receipt from a purchase made at a particular merchant store for a particular item at a particular time, attaining a certain user status (e.g., raising a heart rate level to exceed a threshold level indicative of vigorous physical activity of the user as determined by a biometric sensor of the user device), and so forth. In another example, the geomoji criteria include a criterion that prevents the use of the geomoji outside of a particular geo-fence. For instance, the custom pictograph can be included in a particular message when the user device is within a particular geo-fence and cannot be included in a particular message when the user device is outside of the particular geo-fence. In other examples, the geomoji criteria include a criterion for a time period when the custom pictograph is available (e.g., available during normal business hours, or available for the next sixty days), a member profile feature criterion (e.g., the custom pictograph is available to users above a specified age), and so on.

In still further embodiments, the geomoji criteria include a criterion based on a temperature, velocity, or other sensor data detected at the user device. For instance, a particular geomoji becomes available to the user when a specified velocity is attained (e.g., as determined by changes in geolocation provided by a GPS component of the user device). In this instance, the user may be biking on a bike path and the user gains access to the particular geomoji if the user reaches the specified velocity on the bike path.

After the third party entity specifies the geomoji configuration data, the third party entity submits the geomoji configuration data to the management module 172. For instance, the third party entity activating a user interface element 480 initiates a submission process. Submitting geomojis for use in conjunction with a social messaging application may be free. In other example embodiments, the management module 172 employs various fee structures to charge the third party entity for submitting or uploading geomojis for use by the geolocation pictograph system 160. In one example, the third party entity pays a flat fee for submitting the geomojis (e.g., a fixed cost per submission or for all submissions). In another example, the management module 172 employs a fee structure based on geolocation (e.g., higher fee associated with higher-valued geolocations such as geolocations corresponding to a high count of message sends or high number of active users of the social messaging service), area dimensions (e.g., higher fee for larger area encompassed by a geo-fence), pay-per-use (e.g., a fee is accrued for each user who selects a particular geomoji for use in a message), pay-per-recipient (e.g., a fee is accrued based on a number of recipients who receive a message that includes the geomoji), or any suitable combination thereof. In still a further example, the management module 172 employs a bidding system that allows bidding between third party entities for an exclusive, or partially exclusive, use of a particular geolocation in connection with a pictograph. In an example, the custom pictograph for a highest bidder in connection with a particular geolocation can be more conspicuously presented to the user as compared to a lower bidder (e.g., pictographs for a particular geolocation may be sorted by bid amount, with the pictograph corresponding to the highest bidder being first so as to promote the use of that pictograph over other pictographs).

The third party entity may generate revenue from the custom pictograph submitted to the management module 172. For instance, the third party entity can specify a fee for use by an end user of a particular pictograph submitted to the management module 172. In some cases, a portion of the fee is directed to a host of the geolocation pictograph system 160 (e.g., the fee is divided among the host and the third party entity). In other cases, the host of the geolocation pictograph system 160 can generate revenue by selling access to geomojis based on use count (e.g., providing a specified number of uses of geomojis for a fixed or dynamically determined price), geographic regions (e.g., providing access to geomojis in specified geographic regions for a fixed or dynamically determined price), and other metrics.

Referring now to FIG. 5, another example user interface 500 configured to receive geomoji configuration data is illustrated. Similar to the user interface 400 of FIG. 4, the user interface 500 is configured to receive a pictograph 510 (the custom pictograph) uploaded or submitted using a user interface element 520. In contrast to the user interface 400, in the user interface 500, the third party entity submits, by activating a user interface element 530, geomoji configuration data that includes a specified entity identifier 540. For example, the specified entity identifier 540 is a company name that the pictograph module 170 subsequently uses to identify the custom pictograph corresponding to the company name. In other examples, the specified entity identifier 540 can be a facility name (e.g., a soccer field, a stadium, or a school), a geolocation type (e.g., a historical landmark), a geographic attribute, characteristics, or feature (e.g., a specified number of users being at a geo-location at the same time), or another identifier operable to identify particular geolocations. Using the user interface 500, the third party entity can provide the geomoji configuration data without expressly specifying geographic data (e.g., latitude and longitude).

The geomoji configuration data shown in FIG. 5 can allow for various fee structures to charge the third party entity in addition to those described above. For instance, the third party entity can be charged per location of use of the geomoji (e.g., where the geographic indication is associated with multiple geolocations), pay for exclusive, or partially exclusive, use of the custom pictograph in association with a geolocation type (e.g., the custom pictograph being identified in connection with determining the user device is at a sport related geolocation like a baseball diamond), and so on.

Referring back to FIG. 3, at operation 320, the geolocation module 166 receives the current geolocation of a user device in real time. For example, the user device is a geolocation enabled smart phone that includes a GPS component operable to detect geolocation data such as latitude, longitude, altitude, and a time stamp. In this example, the geolocation module 166 monitors, tracks, receives, requests, accesses, or otherwise obtains the geolocation data from the user device at periodic intervals. In other embodiments, the geolocation module 166 receives the geolocation data from the user device with the request for the relevant pictograph and does not receive the geolocation data at periodic intervals.

In other embodiments, the geolocation module 166 obtains or derives geolocation data of the user device using other location services such as Internet Protocol (IP) geolocation, WI-FI® signal triangulation, BLUETOOTH® beacon signal detections that can indicate a particular location, and so forth. In an example, a particular merchant store employs a BLUETOOTH® beacon. When the BLUETOOTH® beacon is detected by the user device, an indication of the detection is communicated to the geolocation module 166. In this example, the geolocation of the BLUETOOTH® beacon is known or is accessible via a lookup of a beacon identifier included in the indication of the beacon detection. Based on the indication of the beacon detection and the beacon identifier, the geolocation module 166 infers that the user device is within a communication distance (e.g., a short distance such as a communication range of approximately ten meters for class 2 BLUETOOTH®) of the BLUETOOTH® beacon. In this way, the geolocation module 166 infers the current geolocation of the user device based on detection of the BLUETOOTH® beacon. In a similar manner, the current geolocation of the user device can be inferred from other signal detections originating from a known location (e.g., BLUETOOTH® detection of a peer device whose current geolocation can be ascertained or other near field communication signal detections).

At operation 330, the pictograph module 170 identifies the pictograph based on the current geolocation of the user device and the geographic indication specified in the geomoji configuration data. In an example, multiple third party entities submit multiple custom pictographs to the geolocation pictograph system 160. The pictograph module 170 identifies the custom pictographs associated with the current geolocation of the user device from among the multiple custom pictographs. In this way, the pictograph module 170 identifies the custom pictographs that are relevant to the current geolocation of the user device. Further aspects of the operation 330 are discussed below in connection with FIGS. 6-10.

At operation 340, the presentation module 164 causes presentation of the custom pictograph on a user interface of the user device. For example, the custom pictograph is inserted, included, or otherwise incorporated into a virtual keyboard of the user interface of the user device. In some instances, the virtual keyboard is a system keyboard provided by an operating system of the user device that allows for custom characters and symbols. In other instances, the virtual keyboard is generated by the presentation module 164 and includes the custom pictograph along with standard alphanumeric keys and other functions.

In some embodiments, the virtual keyboard comprises a portable virtual keyboard used in conjunction with the third party applications of the user device. For instance, the portable virtual keyboard can execute concurrently with the third party applications and the third party applications can receive, access, or otherwise obtain input generated at the portable virtual keyboard. In a specific example, a particular third party application (e.g., a publication application such as a blogging application or a social networking application) can employ the portable virtual keyboard for textual input. In this specific example, the portable virtual keyboard includes the custom pictograph and the particular third party application receives the custom pictograph in response to a user selection of the custom pictograph on the portable virtual keyboard. In this way, the third party applications of the user device can receive, access, or otherwise obtain the custom pictograph from the geolocation pictograph system 160.

In other embodiments, the virtual keyboard is an add-on or addition to a system keyboard of the user device. For instance, the system keyboard of the user device can provide standard inputs (e.g., alphanumeric character inputs) and the virtual keyboard can be used in addition to the system keyboard to provide additional characters or symbols such as the custom pictograph. In these embodiments, the third party applications of the user device can access the custom pictograph via the system keyboard.

Once the custom pictograph is included in the virtual keyboard of the user device, the user can select the custom pictograph from among characters and symbols of the virtual keyboard. In various embodiments, selecting the custom pictograph renders the custom pictograph into a particular message that the user is composing. In these embodiments, the pictograph is rendered alongside other characters rendered or generated in response to key selections from the virtual keyboard. In some embodiments, the presentation module 164 causes presentation of the custom pictograph on the user interface of the user device by transmitting the custom pictograph to the user device with instructions to cause presentation of the custom pictograph. Further aspects of presenting the custom pictographs on the user interface of the user device are discussed below in connection with FIGS. 11-18.

In various embodiments, the user device caches or otherwise stores the custom pictograph for subsequent use. For example, if the user frequently visits a particular geolocation, the user device can store the custom pictograph corresponding to the particular location upon a first or subsequent visit to the particular geolocation. In this example, the user device storing the custom pictograph allows for omission of transmitting the custom pictograph to the user device for subsequent visits to the particular geolocation.

In other embodiments, the user device can automatically download or otherwise obtain the custom pictograph upon entering or breaching a particular geo-fence corresponding to the custom pictograph (e.g., downloading the custom pictograph in a background process of the user device). In still other embodiments, the user device can preemptively download or otherwise obtain certain custom pictographs for certain geolocations the user is likely to visit (e.g., geolocations within a radius of frequently visited geolocations of the user or predicted geolocations of the user such as geolocations visited by users similar to the user on the social messaging service).

In yet other embodiments, the user device downloads or otherwise obtains a library of custom pictographs that includes various custom pictographs for certain geolocations or certain geolocation types. In some embodiments, the library of custom pictographs is preloaded and is periodically updated by the geolocation pictograph system 160. In these embodiments, the user device identifies a particular custom pictograph from among the library of custom pictographs without communicating with a server. In further embodiments, the preloaded library of pictographs can act as a default when a particular custom pictograph cannot be accessed by the user device.

Figure 6:
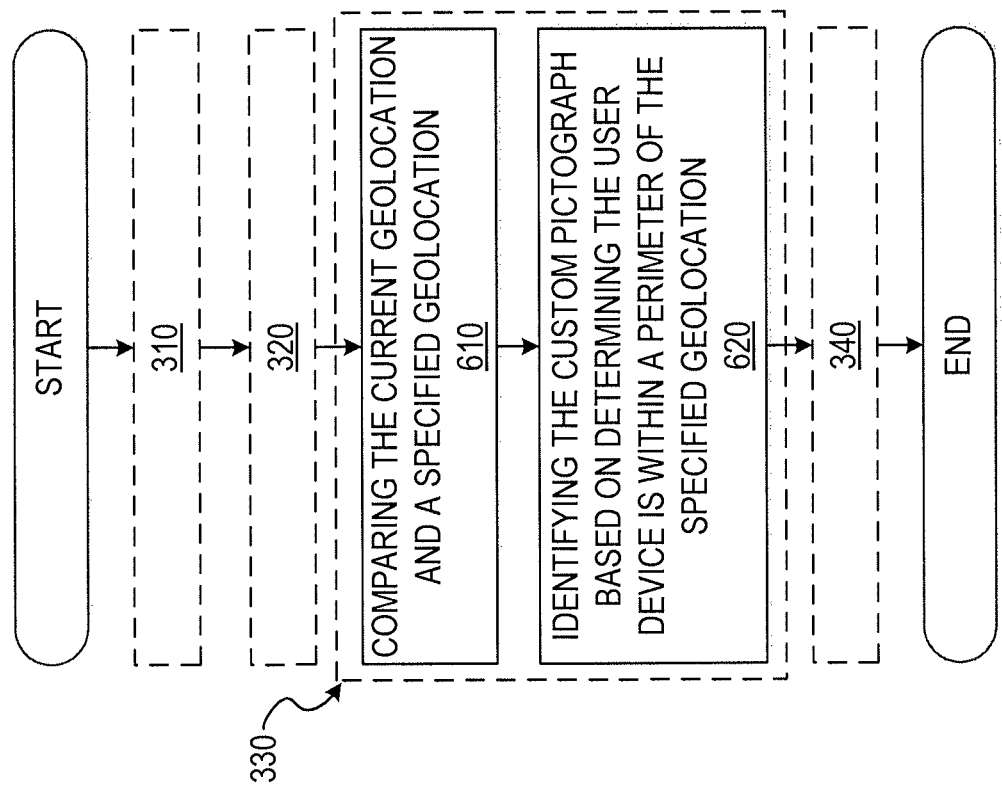
FIG. 6 is a flow diagram illustrating further example operations for identifying a pictograph based on a geographic indication, according to some example embodiments.

Referring now to FIG. 6, a flow diagram illustrating further example operations for identifying the custom pictograph based on the geographic indication is shown. Subsequent to the geolocation module 166 receiving the current geolocation of the user device at the operation 320, the pictograph module 170 identifies the pictograph based on the current geolocation at the operation 330. In some embodiments, the operation 330 includes the additional operations of FIG. 6.

At operation 610, the pictograph module 170 compares the current geolocation and the specified geolocation corresponding to the custom pictograph, consistent with some embodiments. As described in connection with FIG. 4 above, in these embodiments, the geographic indication indicates the specified geolocation (the geomoji configuration data including the specified geolocation provided by the third party entity along with the custom pictograph).

At operation 620, the pictograph module 170 identifies the pictograph based on determining that the user device is within a perimeter of the specified geolocation. That is to say, when the current geolocation is within a virtual boundary of the specified geolocation, the pictograph module 170 identifies the custom pictograph corresponding to the specified geolocation. For example, when the management module 172 receives the specified geolocation and the custom pictograph from the third party entity, the management module 172 stores the custom pictograph in a geospatial database such as the database(s) 134 (e.g., a databased optimized for spatial queries) searchable by geolocation. In this example, the pictograph module 170 queries the geospatial database for the custom pictograph using the current geolocation.

Figure 7:
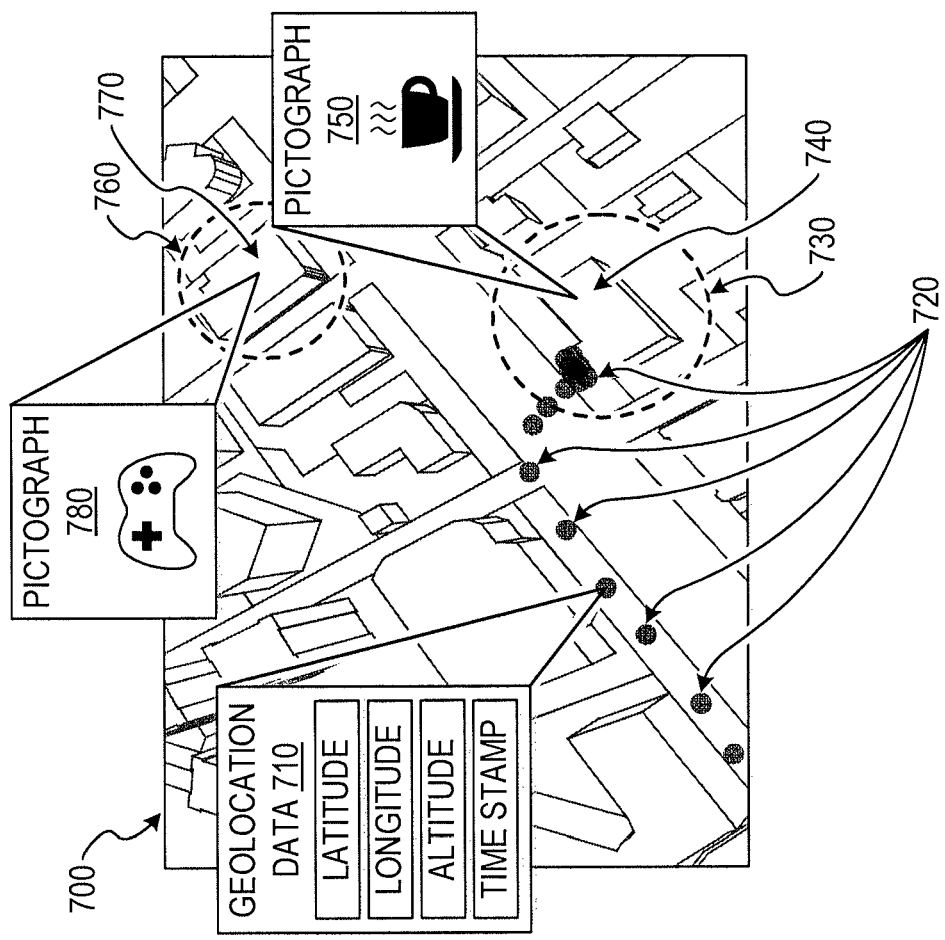
FIG. 7 is a diagram illustrating identifying a pictograph based on a geographic indication, according to some example embodiments.

To help illustrate the concepts of FIG. 6, FIG. 7 is a diagram illustrating identifying the custom pictograph based on the geographic indication. A scene 700 shows a particular geographic area. Geolocation data 710 is data corresponding to a particular geolocation of the particular geographic area. In various embodiments, the geolocation data 710 includes a latitude, a longitude, an altitude, and a time stamp. In an embodiment, the geolocation data 710 is received from the user device in real time. Geolocations 720 are instances of location data, such as the geolocation data 710, received at the geolocation module 166.

In some instances, the pictograph module 170 uses density clustering techniques or averaging techniques to determine that the user device is within a geo-fence 730. For example, if the geolocation data 710 indicates that the user device is temporarily or momentarily within the geo-fence 730, in an embodiment, the pictograph module 170 does not cause presentation of the custom pictograph. In some embodiments, the pictograph module 170 uses a wait period when determining that the user device is within a perimeter of the specified geolocation. For instance, if the user device is within the perimeter of the specified geolocation for a period of time (e.g., twenty seconds), the pictograph module 170 causes presentation of the custom pictograph. However, if the user device is within the perimeter but does not satisfy the wait period, the pictograph module 170 does not cause presentation of the custom pictograph. In some embodiments, once available, the pictographs can be used permanently or for a limited amount of time (as determined, optionally, by a third party entity).

In a specific example, a coffee shop 740 created a geomoji to promote their business. The geomoji configuration data provided by the coffee shop 740 includes the geo-fence 730 and a pictograph 750. When a particular geolocation of the geolocations 720 is within the geo-fence 730, the pictograph module 170 identifies the pictograph 750 included in the geomoji configuration data. In another example, a gaming store 770 created another geomoji with geomoji configuration data including a geo-fence 760 and a pictograph 780. When the current geolocation of the user device is within the geo-fence 760, the pictograph module 170 identifies the pictograph 780. In the scene 700, the geolocations 720 of the user device indicate that the user device was not within the geo-fence 760 and the pictograph module 170 would not identify the pictograph 780.

The specified geolocation of the geomoji configuration data can drive social behavior (e.g., similar to location hacking type social behavior). For example, attaining access to a particular pictograph exclusively available at a particular geolocation can create an incentive for users to visit the particular geolocation. In a specific example, a particular geomoji is configured such that it is exclusively accessible when within a geo-fence surrounding the observation deck of the Empire State Building. In this example, merely being at the base of the Empire State Building would not be sufficient to access the particular geomoji as the geo-fence surrounding the observation deck includes an altitude parameter. A variety of geolocation based achievements or attainments can be incentivized using various geomojis (e.g., attaining access to a particular geomoji when a top of a particular summit is reached).

Figure 8:
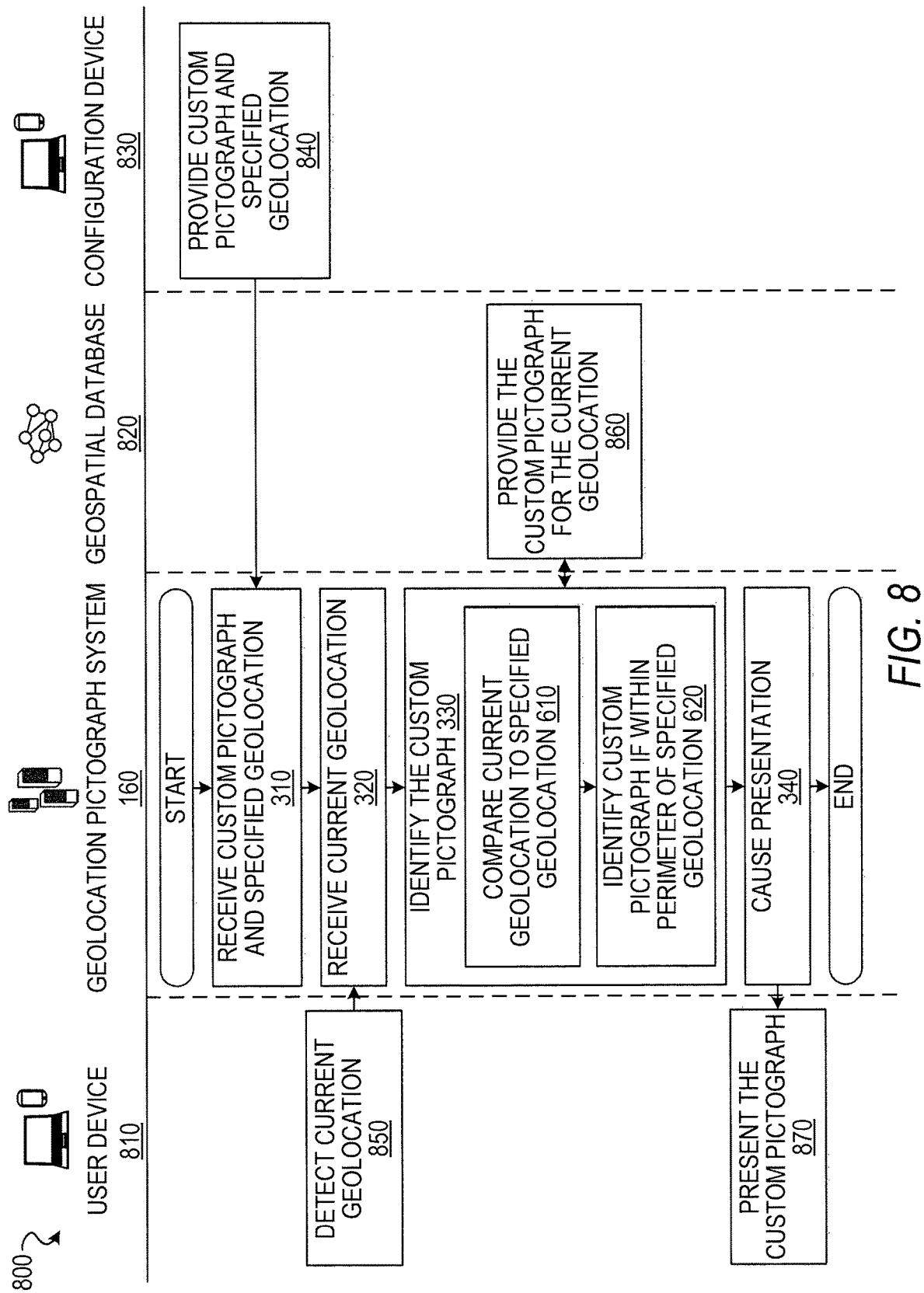
FIG. 8 is an interaction diagram showing example operations at various devices, according to some example embodiments.

To illustrate various communications between devices of the method 300, FIG. 8 is an interaction diagram 800 showing example operations at various devices. At operation 840, a configuration device 830 (e.g., a computer of the third party entity specifying the geomoji configuration data) provides the geomoji configuration data including the custom pictograph and the specified geolocation to the geolocation pictograph system 160. At the operation 310, the communication module 162 or the management module 172 receives the custom pictograph and the specified, selected, or otherwise designated geolocation from the configuration device 830.

Subsequent to the operation 310, at operation 850, a user device 810 detects the current geolocation and communicates the current geolocation to the geolocation pictograph system 160. At the operation 320, the geolocation module 166 receives the current geolocation from the user device 810.

After receiving the current geolocation, at the operation 330, the pictograph module 170 identifies the custom pictograph received at the operation 310. In some embodiments, the operation 330 includes the operation 610 and the operation 620. At the operation 610, the pictograph module 170 compares the current geolocation to the specified geolocation. At the operation 620, the pictograph module 170 identifies the custom pictograph if the current geolocation is within the perimeter of the specified geolocation. In some embodiments, the custom pictograph is stored in a geospatial database 820 and the pictograph module 170 queries the geospatial database 820 for the custom pictograph. In some embodiments, the geospatial database 820 is part of the geolocation pictograph system 160, and in other embodiments, the geospatial database 820 is independent of the geolocation pictograph system 160. At operation 860, the geospatial database 820 provides the custom pictograph for the current geolocation in response to a query from the geolocation pictograph system 160.

Once the custom pictograph is identified, at the operation 340, the presentation module 164 causes presentation of the custom pictograph to the user device 810. At operation 870, the user device 810 presents the custom pictograph to the user. For instance, the custom pictograph is embedded, inserted, or included in a virtual keyboard of a user interface on the user device 810.

Figure 9:
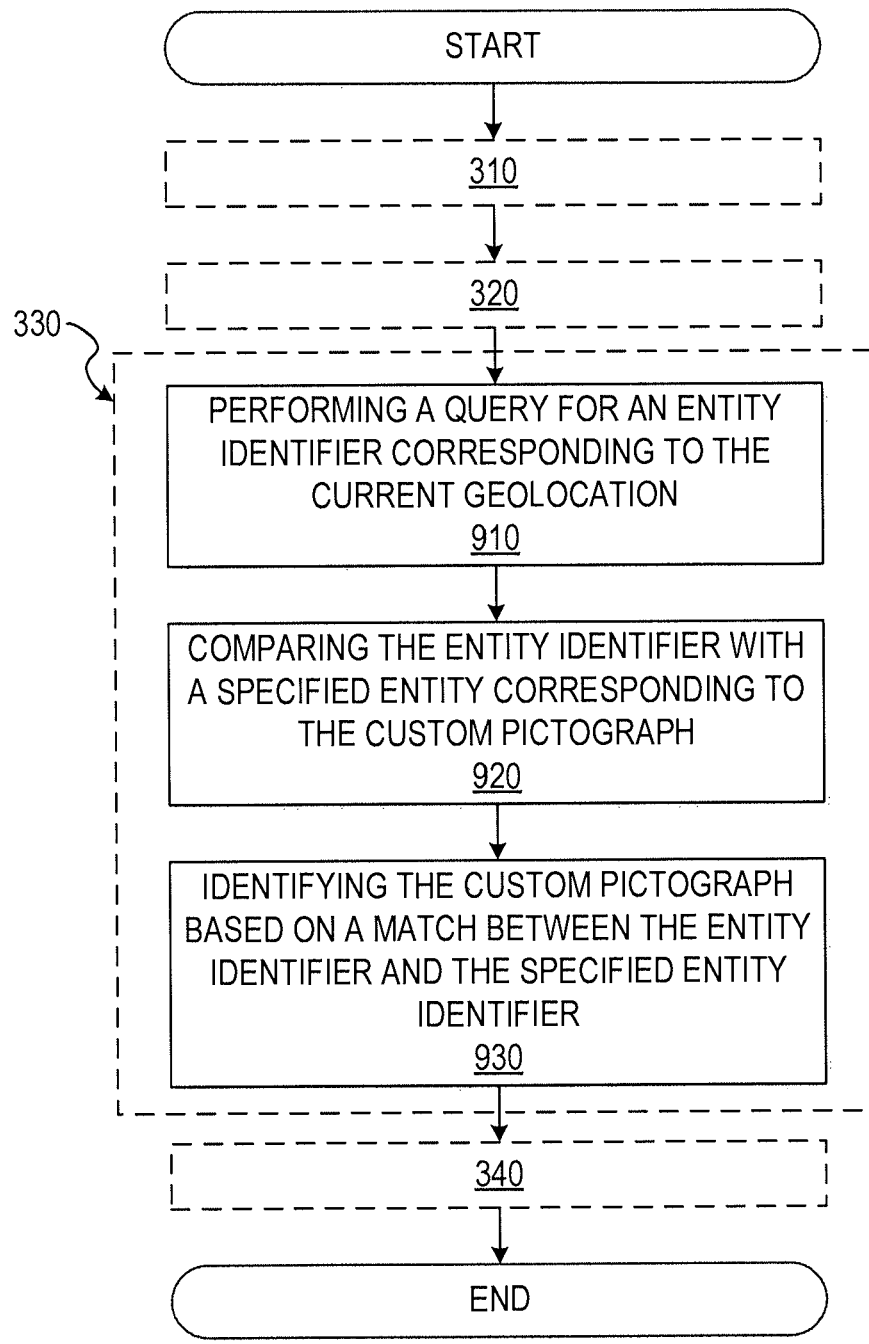
FIG. 9 is a flow diagram illustrating further example operations for identifying a pictograph based on a geographic indication, according to some example embodiments.

FIG. 9 is a flow diagram illustrating further example operations for identifying a pictograph based on a geographic indication. Subsequent to the geolocation module 166 receiving the current geolocation of the user device at the operation 320, the pictograph module 170 identifies the pictograph based on the current geolocation at the operation 330. In some embodiments, the operation 330 includes the additional operations of FIG. 9.

At operation 910, the pictograph module 170 performs a query for an entity identifier corresponding to the current geolocation. For example, the pictograph module 170 requests the entity identifier at a third party geospatial service or a geospatial service hosted by the geolocation pictograph system 160. In this example, the request includes the current geolocation and the third party geospatial service responds with an entity identifier such as an entity name. For example, if the current geolocation of the user device is at STARBUCKS®, the geospatial service responds to a request that includes the current geolocation with the entity name STARBUCKS®.

At operation 920, the pictograph module 170 compares the entity identifier with the specified entity corresponding to the custom pictograph. In the example above, if the entity identifier is an entity name such as STARBUCKS®, the pictograph module 170 simply compares the entity name to a specified entity name included in the geomoji configuration data.

At operation 930, the pictograph module 170 identifies the custom pictograph based on a match between the entity identifier and the specified entity identifier. Continuing with the example above, if the geomoji configuration data specifies the custom pictograph for a particular entity name such as STARBUCKS®, then the pictograph module 170 identifies the custom pictograph based on a match between the specified entity name and an entity name corresponding to the current geolocation.

Figure 10:
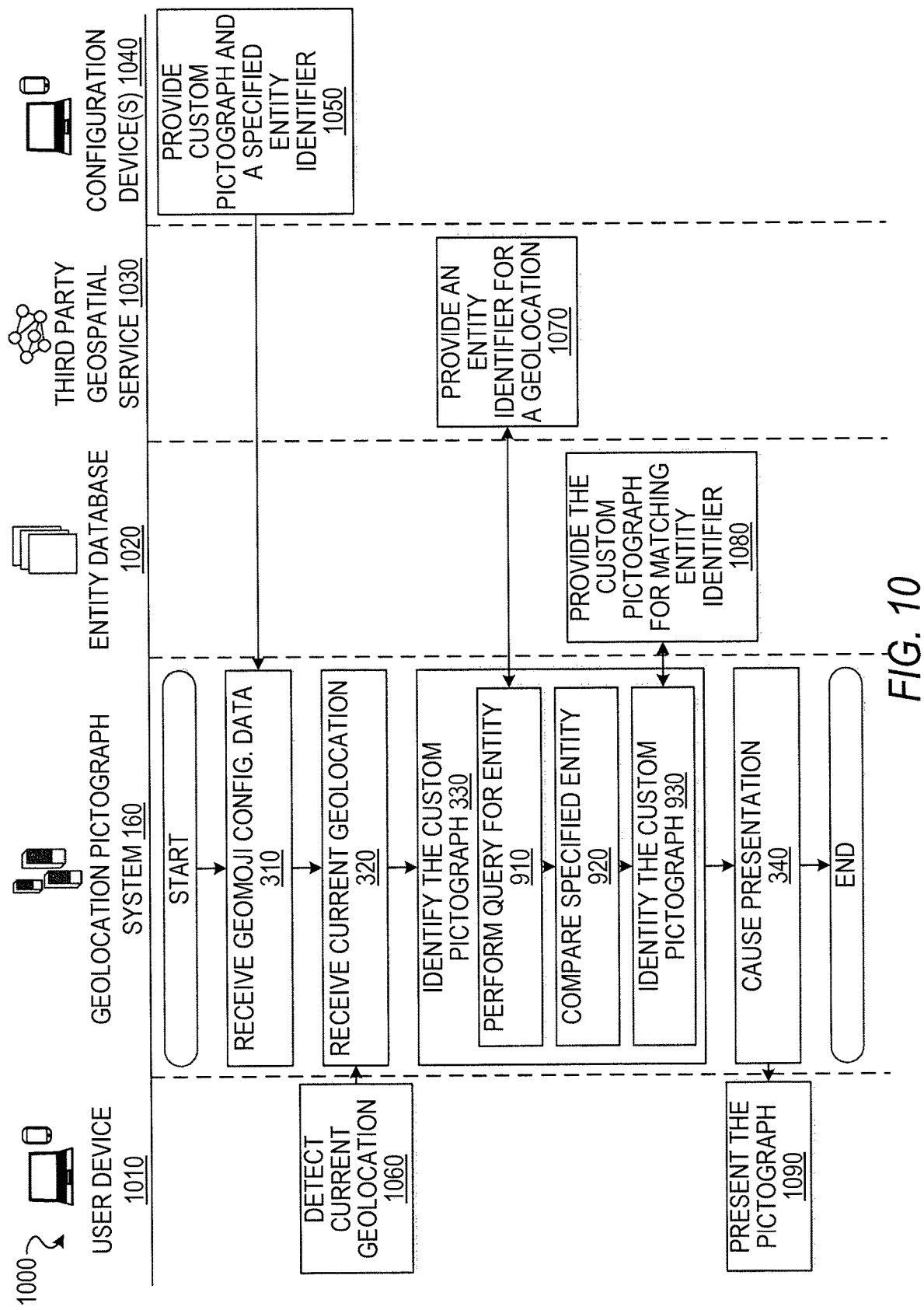
FIG. 10 is an interaction diagram showing example operations at various devices, according to some example embodiments.

To illustrate the interactions between devices of FIG. 9, FIG. 10 is an interaction diagram 1000 showing example operations at various devices. At operation 1050, a configuration device 1040 (e.g., a computer of the third party entity specifying the geomoji configuration data) provides the geomoji configuration data including the custom pictograph and the specified entity identifier to the geolocation pictograph system 160. At the operation 310, the communication module 162 or management module 172 receives the custom pictograph and the specified, selected, or otherwise designated entity identifier from the configuration device 1040.

Subsequent to the operation 310, at operation 1060, a user device 1010 detects the current geolocation and communicates the current geolocation to the geolocation pictograph system 160. At the operation 320, the geolocation module 166 receives the current geolocation from the user device 1010.

After the current geolocation is received, at the operation 330, the pictograph module 170 identifies the custom pictograph received at the operation 310. In some embodiments, the operation 330 includes the operation 910, the operation 920, and the operation 930. At the operation 910, the pictograph module 170 performs a query for the entity identifier corresponding to the current geolocation. For example, the pictograph module 170 requests the entity identifier from a third party geospatial service 1030. At operation 1070, the third party geospatial service 1030 responds to the request by identifying the entity identifier based on the current geolocation included in the request and communicating the entity identifier to the pictograph module 170.

At the operation 920, the pictograph module 170 compares the specified entity identifier included in the geomoji configuration data with the entity identifier corresponding to the geolocation. At the operation 930, the pictograph module 170 identifies the custom pictograph based on a match between the entity identifier and the specified entity identifier. For instance, the pictograph module 170 queries an entity database 1020 for the custom pictograph using the entity identifier corresponding to the current geolocation. At operation 1080, the entity database 1020 provides the custom pictograph for the matching entity identifier to the pictograph module 170. In some embodiments, the entity database 1020 is hosted by the geolocation pictograph system 160 (e.g., the database(s) 134).

Once the custom pictograph is identified, at the operation 340, the presentation module 164 causes presentation of the custom pictograph to the user device 1010. At operation 1090, the user device 1010 presents the custom pictograph to the user. For instance, the custom pictograph is embedded in a virtual keyboard of a user interface on the user device 1010.

Figure 11:
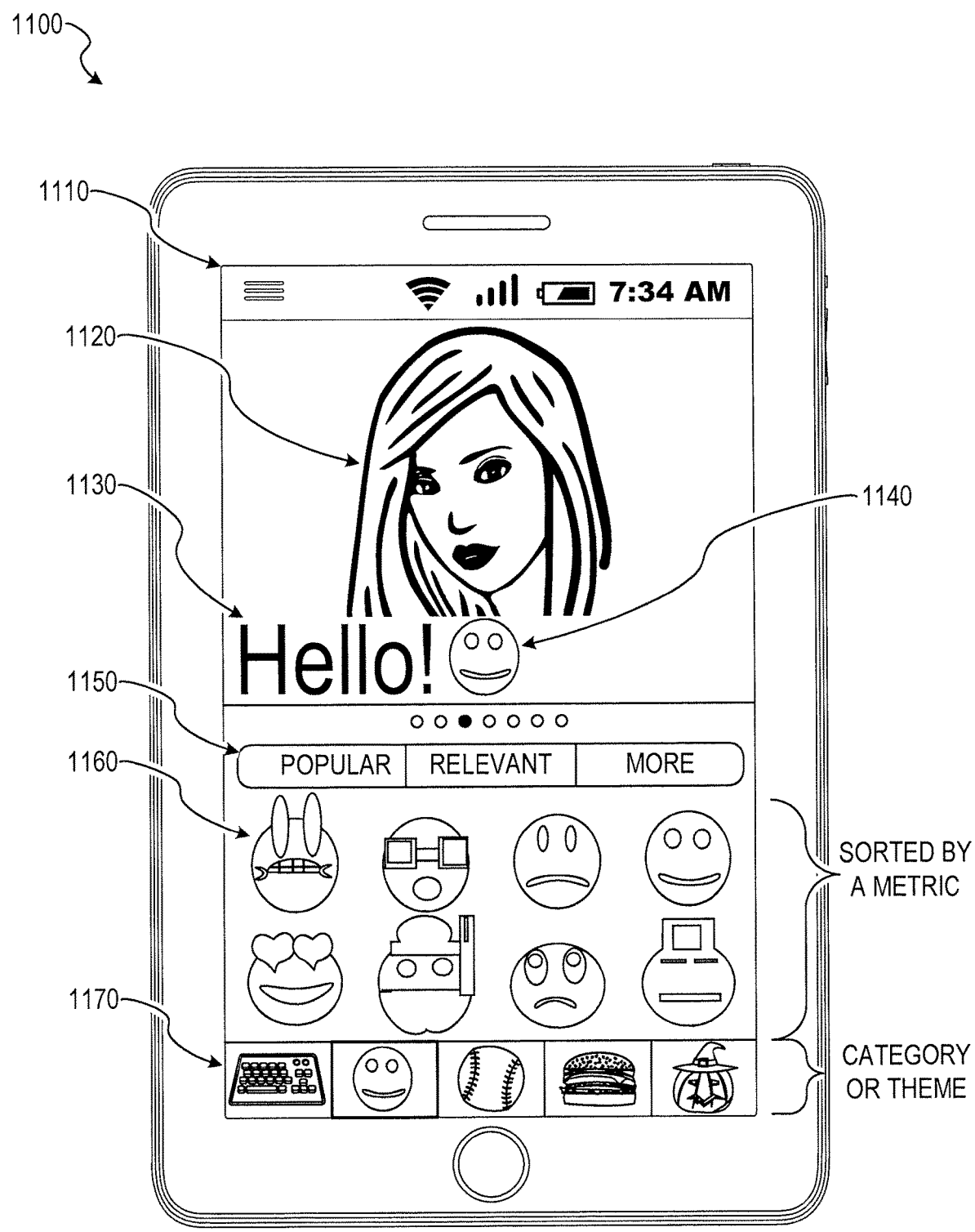
FIG. 11 illustrates an example user interface that includes pictographs identified based on a geographic indication, according to some example embodiments.

FIG. 11 depicts an example user device 1100 (e.g., smart phone) displaying an example user interface 1110 that includes various pictographs identified based on a geographic indication. Although user interfaces described herein (e.g., FIGS. 4, 5, 11, 13, 16, and 18) depict specific example user interfaces and user interface elements, these are merely non-limiting examples and many other alternate user interfaces and user interface elements can be generated by the presentation module 164 and presented to the user. It will be noted that alternate presentations of the displays described herein include additional information, graphics, options, and so forth; other presentations include less information, or provide abridged information for easy use by the user.

In various example embodiments, the user interface 1110 is an example of a message composition user interface of a social messaging app executing on a mobile device. In an embodiment, the user interface 1110 includes message content comprising an image 1120 (still photos/pictures or video) (e.g., captured by a camera sensor of the user device 1100), a text 1130, a pictograph 1140, a sorting element 1150, a plurality of pictographs 1160, and a category element 1170. The plurality of pictographs 1160 include standard emojis (e.g., provided by an operating system of the user device 1100) and geomojis received from the geolocation pictograph system 160. In various embodiments, the plurality of pictographs 1160 is scrollable (e.g., more pictographs can be viewed in response to a scroll touch gesture of the user). In some embodiments, the sorting element 1150 provides an option to sort the plurality of pictographs 1160, or otherwise navigate the plurality of pictographs 1160, according to various schemes such as sorting based on recentness (e.g., based on temporal information such as creation dates corresponding to the respective pictographs), price (e.g., if the pictographs are for sale), relevancy of the respective pictographs to various data, or other metrics.

Activating (e.g., the user tapping on the pictograph on a touch screen display) a particular pictograph of the plurality of pictographs renders the pictograph alongside characters generated in response to key selections of a virtual keyboard of the user device 1100. For instance, the pictograph 1140 is rendered in accordance with characters rendered in response to a particular key selection of the virtual keyboard. In this way, the pictographs of the plurality of pictographs 1160 are similar to additional keys or characters of the virtual keyboard and operate in a similar manner.

Figure 12:
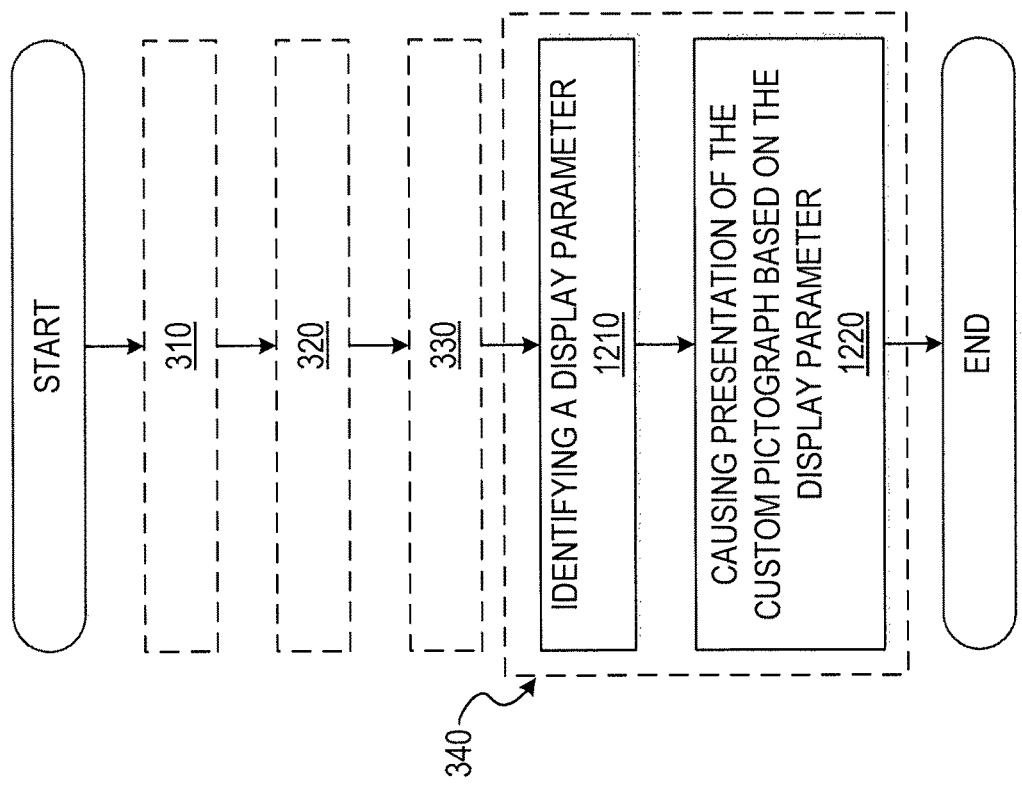
FIG. 12 is a flow diagram illustrating further operations for causing presentation of pictographs on a user interface, according to some example embodiments.

FIG. 12 is a flow diagram illustrating further operations for causing presentation of pictographs on a user interface. In various embodiments, the operation 340 for causing presentation of the custom pictograph described above includes the additional operations of FIG. 12.

At operation 1210, the presentation module 164 identifies a display parameter. For example, the display parameter can comprise a display resolution, a display text size, a display image size, and so on.

At operation 1220, the presentation module 164 causes presentation of or renders the custom pictograph based on the display parameter. For example, if the display parameter comprises the display text size, the presentation module 164 renders the custom pictograph to match the display text size. In another example, if the display parameter comprises the display image size, the presentation module 164 renders the custom pictograph proportionally to the display image size (e.g., a larger message image results in a larger rendering of the custom pictograph). In yet another example, the presentation module 164 adapts the resolution of the pictograph to the display resolution.

Figure 13:
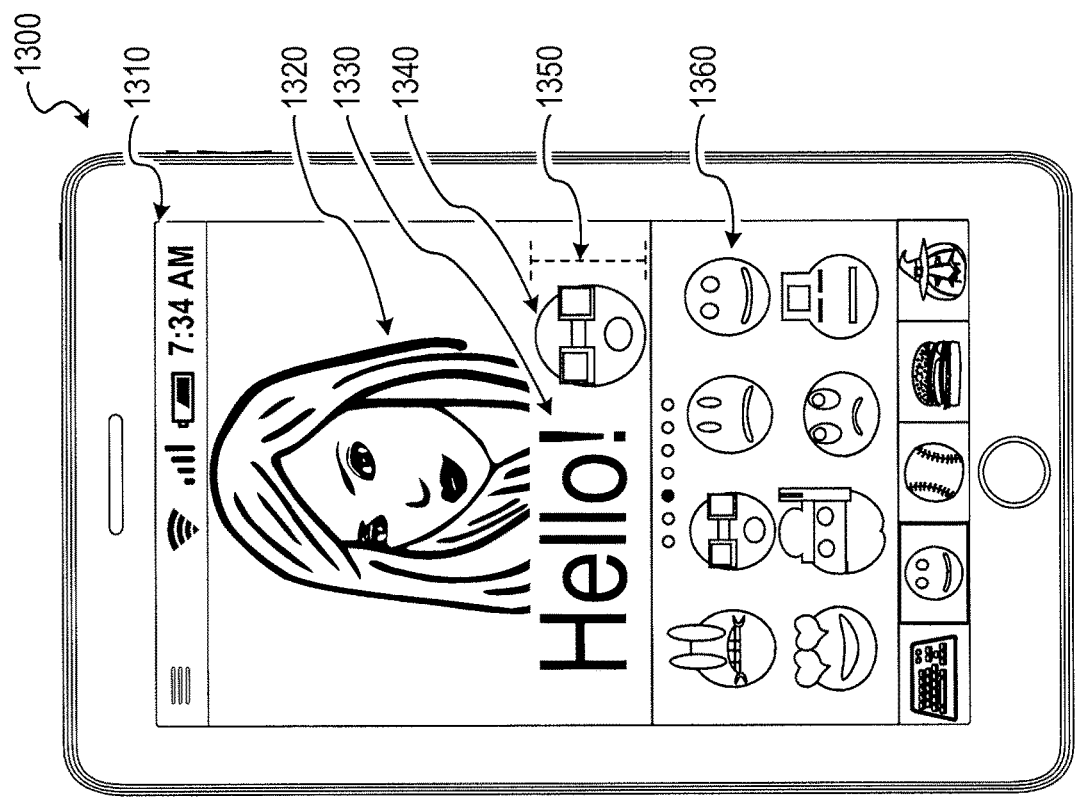
FIG. 13 illustrates an example user interface that includes pictographs rendered based on a display parameter, according to some example embodiments.

To further illustrate the concepts of FIG. 12, FIG. 13 depicts an example user device 1300 displaying an example user interface 1310 that includes pictographs rendered based on a display parameter. The user interface 1310 includes an image 1320, text 1330, a pictograph 1340, a display text size 1350, and a plurality of pictographs 1360. In this example, the presentation module 164 identifies the display text size 1350. The presentation module 164 can then render the pictograph 1340 to match the display text size 1350. In a similar manner, the presentation module 164 can identify an image size for the image 1320 and render the pictograph 1340 proportionate to the image 1320. In some embodiments, the presentation module 164 renders the pictograph 1340 based on multiple display parameters (e.g., resolution and display text size). In this way, the presentation module 164 adaptively renders the pictograph 1340 based on various display parameters.

Figure 14:
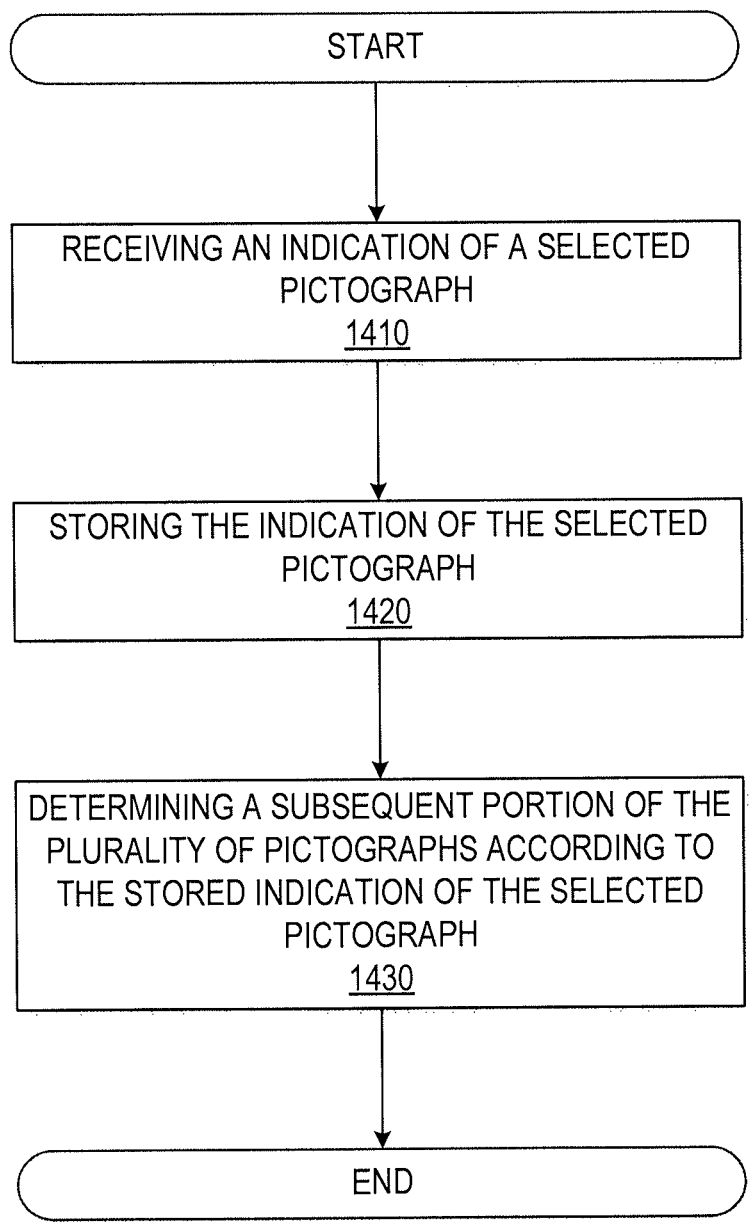
FIG. 14 is a flow diagram illustrating an example method for storing an indication of a selection of a pictograph to be used for subsequent analysis, according to some example embodiments.

FIG. 14 is a flow diagram illustrating an example method 1400 for storing an indication of a selection of a pictograph to be used for subsequent analysis. At operation 1410, the communication module 162 receives an indication of a selected pictograph. For instance, if the user decides to include a particular pictograph in a particular message, the user can select the pictograph by providing input to the user device. Once the user indicates a selection, the user device communicates the indication of the selected pictograph to the communication module 162.

At operation 1420, the data module 168 stores the indication of the selected pictograph in association with the user of the user device. For instance, the data module 168 can store the indication of the selected pictograph in database(s) 134 to be used in subsequent analysis by the geolocation pictograph system 160.

At operation 1430, the pictograph module 170 determines a subsequent portion of the plurality of pictographs according to the stored indication of the selected pictographs. For instance, the pictograph module 170 can identify frequently used pictographs of the user and then determine a portion of the plurality of pictographs based on the frequency of use of respective pictographs of the plurality of pictographs. In other embodiments, the pictograph module 170 ranks or sorts the plurality of pictographs according to the stored indication of the selected pictograph. In some embodiments, the pictograph module 170 determines the subsequent portion of the plurality of pictographs based on stored indications of selected pictographs of other users. For instance, the pictograph module 170 can identify the portion of the plurality of pictographs according to frequently used pictographs of other users. In further embodiments, the pictograph module 170 identifies similar users that are similar to the user (e.g., particular users with a same or similar age, gender, or other demographic information). In these embodiments, the pictograph module 170 identifies the portion of the plurality of pictographs based on the indication of the selected pictographs associated with the similar users.

FIG. 15 is a flow diagram illustrating an example method 1500 for causing presentation of a plurality of pictographs based on a metric. At operation 1510, the pictograph module 170 determines a metric for respective pictographs of the plurality of pictographs. For instance, the pictograph module 170 determines the metric comprising at least one of a user preference based on user data, a user status based on device data, a metric based on situational data, a popularity based on a use count, or other metrics.

For example, the data module 168 accesses user data of the user from the database(s) 134. The pictograph module 170 analyzes the user data to determine a user preference. For instance, an age of the user indicated by the user data can be used to determine a preference for certain pictographs (e.g., a school-aged person may be interested in school-related pictographs).

In another example, the communication module 162 receives the device data from the user device. The pictograph module 170 analyzes the device data to determine a user status. For instance, the user may be in a noisy environment. The communication module 162 receives ambient audio data of the user device and the pictograph module 170 determines the user status of being in a noisy environment based on an analysis of the ambient audio data. The pictograph module 170 can determine a variety of other user statuses such as a particular user activity (e.g., watching a movie or television), riding in a car, being indoors or outdoors, and so on.

In yet another example, the data module 168 accesses situational data pertaining to the current geolocation and a current time. For instance, if the current geolocation is that of a stadium, the data module 168 can access situation data pertaining to the stadium for the current time. In this instance, the situational data might indicate that the stadium is hosting a game and the current score of the game.

In still another example, the pictograph module determines a popularity of the respective pictographs of the plurality of pictographs based on a use count of the respective pictographs. For instance, a use count is maintained by the geolocation pictograph system 160 by incrementing a count for each use of a particular pictograph.

At operation 1520, the pictograph module 170 ranks or sorts the plurality of pictographs according to the metric. For instance, the pictograph module 170 ranks the plurality of pictographs by the popularity of the respective pictographs of the plurality of pictographs with the most popular pictograph being ranked first.

At operation 1530, the presentation module 164 causes presentation of the ranked plurality of pictographs. In some instances, user-specified metrics (e.g., color, size, etc.) may be used to sort or rank the plurality of pictographs. Ranking the pictographs by various metrics may assist the user in finding a suitable pictograph for a particular message.

To further illustrate the ideas of FIG. 15, FIG. 16 depicts an example user device 1600 displaying an example user interface 1610 that includes pictographs, including pictographs 1620 and 1640, presented based on a metric, according to some example embodiments. The plurality of pictographs shown in FIG. 16 are ranked according to the popularity of the respective pictographs. The pictograph 1620 is ranked first and is a most popular pictograph among the plurality of pictographs. The pictograph 1640 is ranked last and is a least popular pictograph among the plurality of pictographs. In some embodiments, the presentation module 164 causes presentation of the metric in conjunction with the pictograph. For example, a user interface element 1630 is an indication of the metric. In the example of FIG. 16, the user interface element 1630 indicates a use count associated with the popularity metric for a particular pictograph.

In further example embodiments, the pictograph module 170 modifies the respective pictographs of the plurality of pictographs to indicate the metric corresponding to the respective pictographs. In a specific example, the pictograph module 170 modifies the respective pictographs of the plurality of pictographs to indicate the popularity of the respective pictographs of the plurality of pictographs. For instance, a more popular pictograph may be indicated by brighter coloring, although a variety of other modification can be employed.

Figure 17:
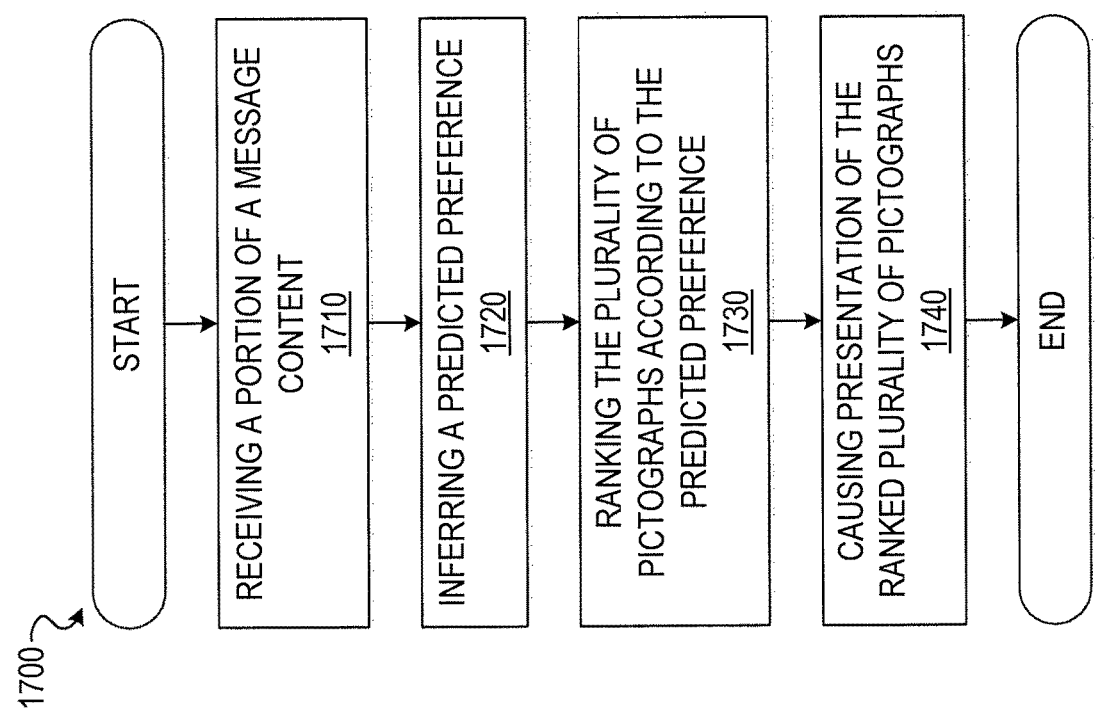
FIG. 17 is a flow diagram illustrating an example method for predictively causing presentation of pictographs, according to some example embodiments.

FIG. 17 is a flow diagram illustrating an example method 1700 for predictively causing presentation of pictographs. At operation 1710, the communication module 162 receives at least a portion of a message content. For instance, the message content comprises an image and text. In this instance, the communication module 162 can receive at least a portion of the text or image.

At operation 1720, the pictograph module 170 infers a predicted preference based on the portion of the message content. For example, if the text is indicative of a particular pictograph category, the pictograph module 170 infers the predicted preference for the indicated category.

At operation 1730, the pictograph module 170 ranks the plurality of pictographs according to the predicted preference. For example, if the predicted preference indicates a particular pictograph category, the pictograph module 170 can rank the plurality of pictographs based on whether respective pictographs belong to the particular pictograph category.

At operation 1740, the presentation module 164 causes presentation of the ranked plurality of pictographs. The ranked plurality of pictographs can assist the user in identifying a suitable pictograph for a particular message.

Figure 18:
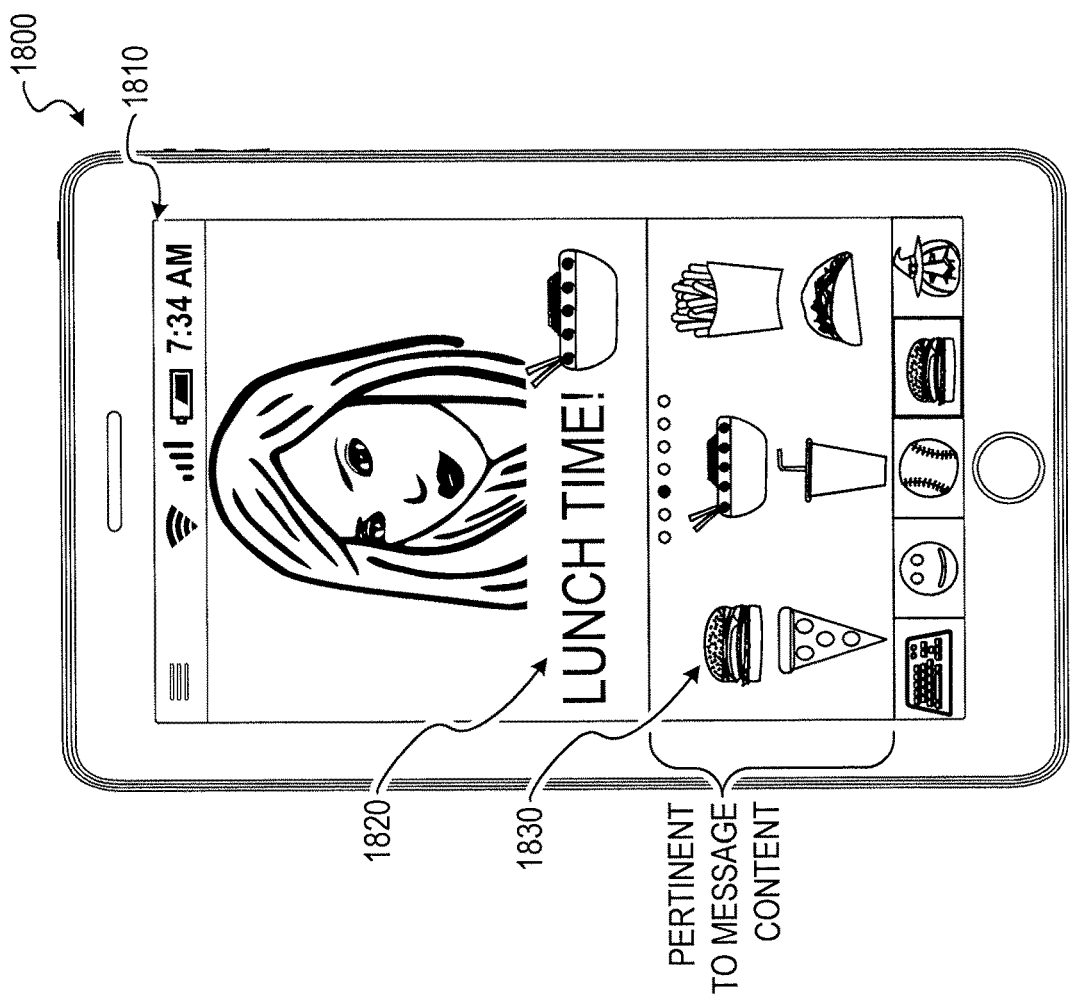
FIG. 18 illustrates an example user interface that includes pictographs predictively presented, according to some example embodiments.

FIG. 18 depicts an example user device 1800 displaying an example user interface 1810 that includes pictographs predictively presented. In the user interface 1810, text 1820 is a portion of a message content generated by the user of the user device 1800. The communication module 162 receives the text 1820 and the pictograph module 170 infers the predicted preference based on the text 1820. In this instance, the text 1820 is indicative of food and the pictograph module 170 ranks a plurality of pictographs 1830 based on pictographs indicative of food. In this way, the user is automatically assisted in finding a particular pictograph that is pertinent to the message content.

Modules, Components, and Logic

Certain embodiments are described herein as including logic or a number of components, modules, or mechanisms. Modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules are located in a single geographic location (e.g., within a home environment, an office environment, or a server farm). In other example embodiments, the processors or processor-implemented modules are distributed across a number of geographic locations.

Applications

Figure 19:
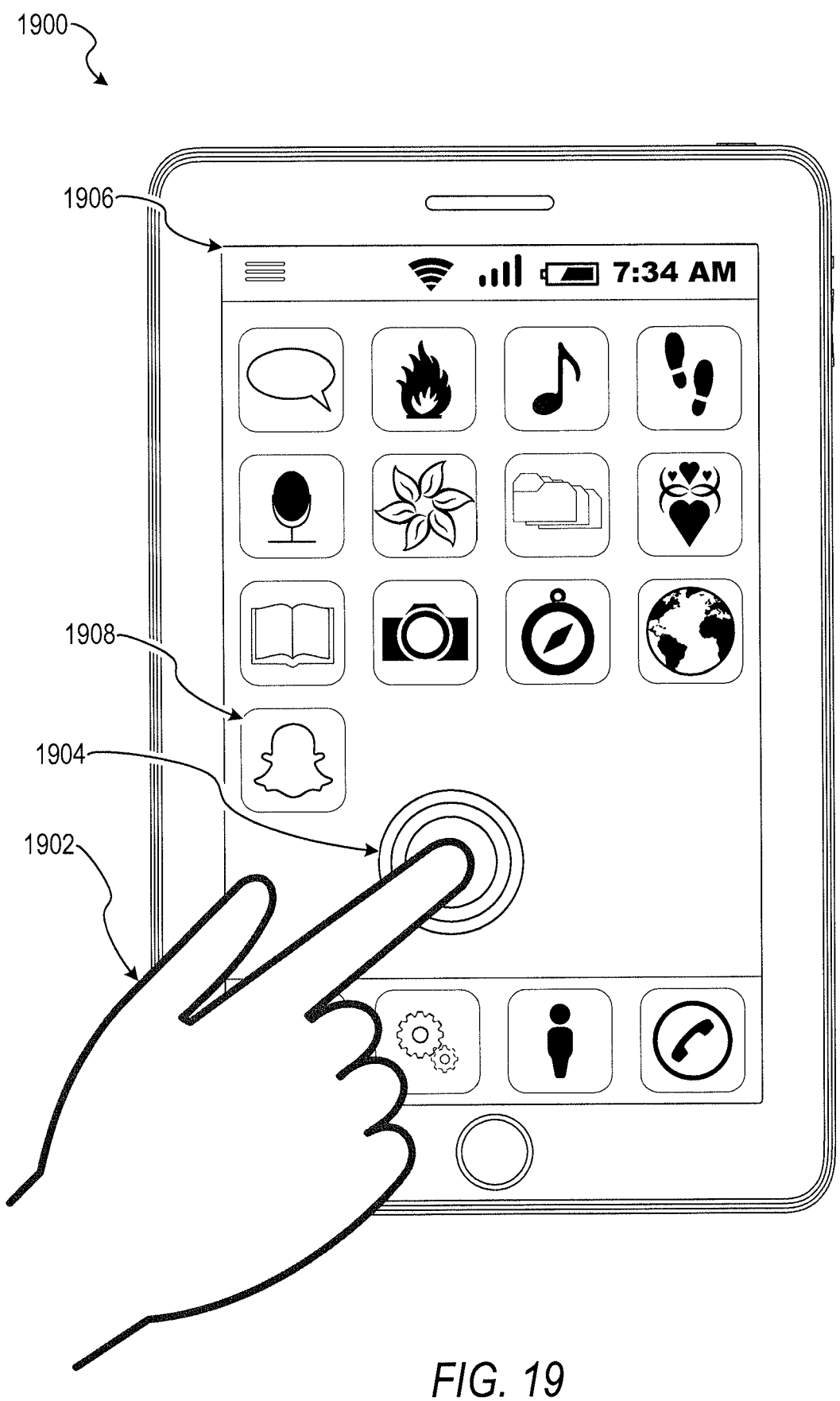
FIG. 19 depicts an example mobile device and mobile operating system interface, according to some example embodiments.

FIG. 19 illustrates an example mobile device 1900 executing a mobile operating system (e.g., IOS™, ANDROID™, WINDOWS® Phone, or other mobile operating systems), consistent with some embodiments. In one embodiment, the mobile device 1900 includes a touch screen operable to receive tactile data from a user 1902. For instance, the user 1902 may physically touch 1904 the mobile device 1900, and in response to the touch 1904, the mobile device 1900 may determine tactile data such as touch location, touch force, or gesture motion. In various example embodiments, the mobile device 1900 displays a home screen 1906 (e.g., Springboard on IOS™) operable to launch applications or otherwise manage various aspects of the mobile device 1900. In some example embodiments, the home screen 1906 provides status information such as battery life, connectivity, or other hardware statuses. The user 1902 can activate user interface elements by touching an area occupied by a respective user interface element. In this manner, the user 1902 interacts with the applications of the mobile device 1900. For example, touching the area occupied by a particular icon included in the home screen 1906 causes launching of an application corresponding to the particular icon.

Many varieties of applications (also referred to as "apps") can be executing on the mobile device 1900, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1900 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1900 includes a social messaging app 1908 such as SNAPCHAT® that, consistent with some embodiments, allows users to exchange ephemeral messages that include media content. In this example, the social messaging app 1908 can incorporate aspects of embodiments described herein.

Software Architecture

Figure 20:
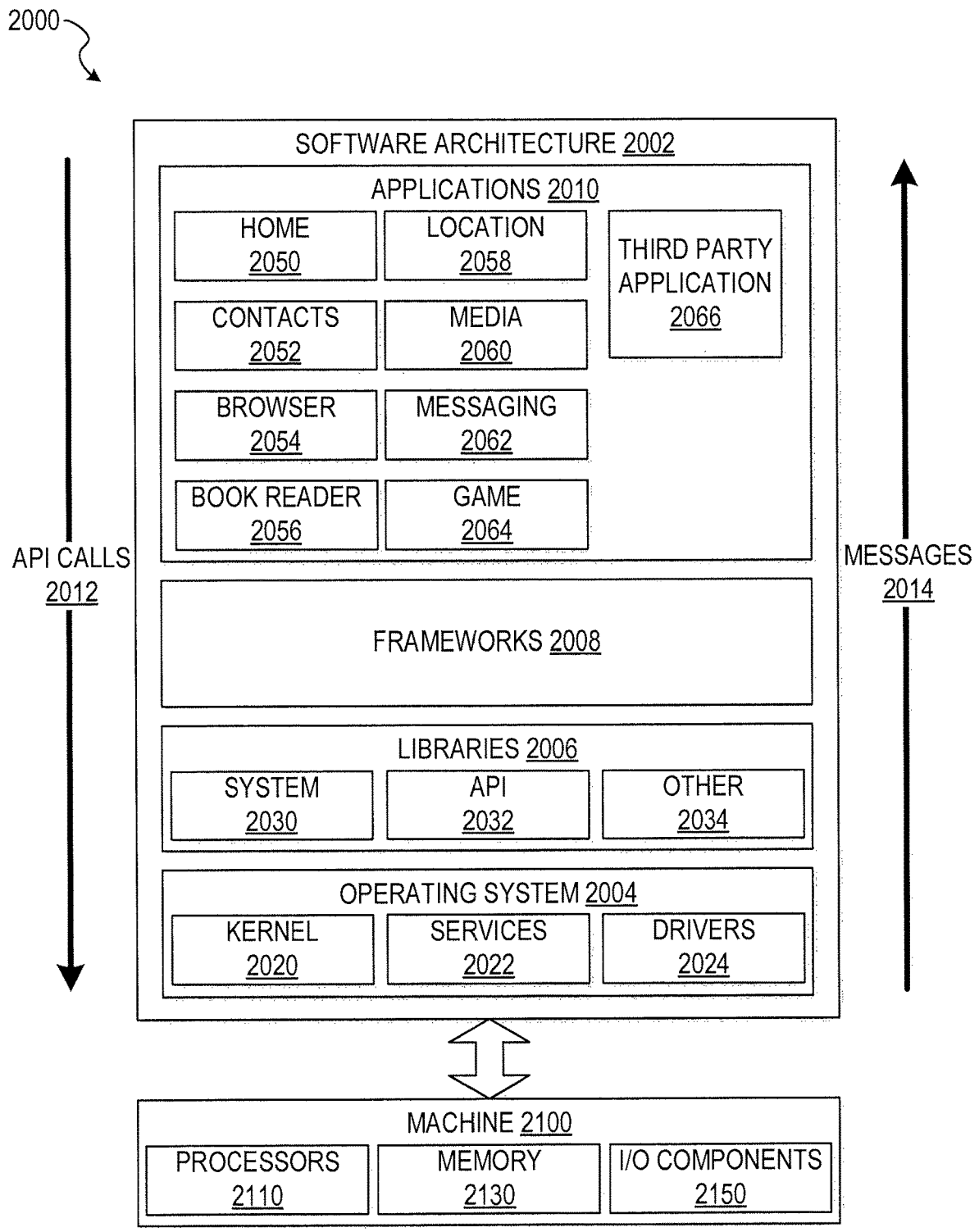
FIG. 20 is a block diagram illustrating an example of a software architecture that may be installed on a machine, according to some example embodiments.

FIG. 20 is a block diagram 2000 illustrating an architecture of software 2002, which can be installed on any one or more of the devices described above. FIG. 20 is merely a non-limiting example of a software architecture, and it will be appreciated that many other architectures can be implemented to facilitate the functionality described herein. In various embodiments, the software 2002 is implemented by hardware such as machine a 2100 of FIG. 21 that includes processors 2110, memory 2130, and I/O components 2150. In this example architecture, the software 2002 can be conceptualized as a stack of layers where each layer may provide a particular functionality. For example, the software 2002 includes layers such as an operating system 2004, libraries 2006, frameworks 2008, and applications 2010. Operationally, the applications 2010 invoke application programming interface (API) calls 2012 through the software stack and receive messages 2014 in response to the API calls 2012, consistent with some embodiments.

In various implementations, the operating system 2004 manages hardware resources and provides common services. The operating system 2004 includes, for example, a kernel 2020, services 2022, and drivers 2024. The kernel 2020 acts as an abstraction layer between the hardware and the other software layers consistent with some embodiments. For example, the kernel 2020 provides memory management, processor management (e.g., scheduling), component management, networking, and security settings, among other functionality. The services 2022 can provide other common services for the other software layers. The drivers 2024 are responsible for controlling or interfacing with the underlying hardware, according to some embodiments. For instance, the drivers 2024 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 2006 provide a low-level common infrastructure utilized by the applications 2010. The libraries 2006 can include system libraries 2030 (e.g., C standard library) that can provide functions such as memory allocation functions, string manipulation functions, mathematic functions, and the like. In addition, the libraries 2006 can include API libraries 2032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2006 can also include a wide variety of other libraries 2034 to provide many other APIs to the applications 2010.

The frameworks 2008 provide a high-level common infrastructure that can be utilized by the applications 2010, according to some embodiments. For example, the frameworks 2008 provide various graphic user interface (GUI) functions, high-level resource management, high-level location services, and so forth. The frameworks 2008 can provide a broad spectrum of other APIs that can be utilized by the applications 2010, some of which may be specific to a particular operating system or platform.

In an example embodiment, the applications 2010 include a home application 2050, a contacts application 2052, a browser application 2054, a book reader application 2056, a location application 2058, a media application 2060, a messaging application 2062, a game application 2064, and a broad assortment of other applications such as a third party application 2066. According to some embodiments, the applications 2010 are programs that execute functions defined in the programs. Various programming languages can be employed to create one or more of the applications 2010, structured in a variety of manners, such as object-oriented programming languages (e.g., Objective-C, Java, or C++) or procedural programming languages (e.g., C or assembly language). In a specific example, the third party application 2066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application 2066 can invoke the API calls 2012 provided by the operating system 2004 to facilitate functionality described herein.

Example Machine Architecture and Machine-Readable Medium

Figure 21:
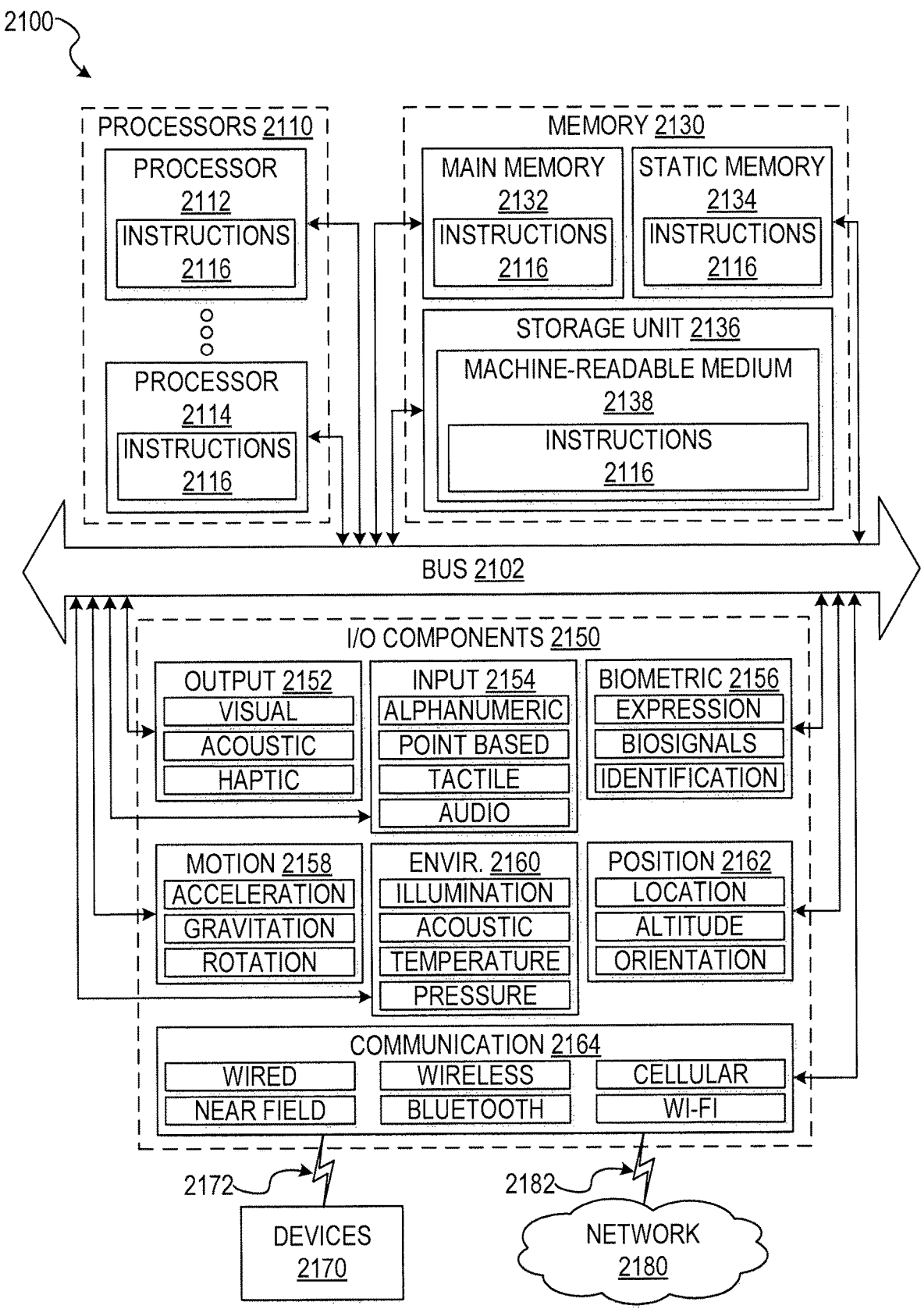
FIG. 21 illustrates a diagrammatic representation of a machine in the form of a computer system within which a set of instructions may be executed for causing the machine to perform any one or more of the methodologies discussed herein, according to an example embodiment.

FIG. 21 is a block diagram illustrating components of a machine 2100, according to some embodiments, able to read instructions from a machine-readable medium (e.g., a machine-readable storage medium) and perform any one or more of the methodologies discussed herein. Specifically, FIG. 21 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein can be executed. In alternative embodiments, the machine 2100 operates as a stand-alone device or can be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

In various embodiments, the machine 2100 comprises processors 2110, memory 2130, and I/O components 2150, which can be configured to communicate with each other via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) includes, for example, a processor 2112 and a processor 2114 that may execute the instructions 2116. The term "processor" is intended to include multi-core processors that may comprise two or more independent processors (also referred to as "cores") that can execute instructions contemporaneously. Although FIG. 21 shows multiple processors, the machine 2100 may include a single processor with a single core, a single processor with multiple cores (e.g., a multi-core processor), multiple processors with a single core, multiple processors with multiples cores, or any combination thereof.

The memory 2130 comprises a main memory 2132, a static memory 2134, and a storage unit 2136 accessible to the processors 2110 via the bus 2102, according to some embodiments. The storage unit 2136 can include a machine-readable medium 2138 on which are stored the instructions 2116 embodying any one or more of the methodologies or functions described herein. The instructions 2116 can also reside, completely or at least partially, within the main memory 2132, within the static memory 2134, within at least one of the processors 2110 (e.g., within the processor's cache memory), or any suitable combination thereof, during execution thereof by the machine 2100. Accordingly, in various embodiments, the main memory 2132, the static memory 2134, and the processors 2110 are considered machine-readable media 2138.

As used herein, the term "memory" refers to a machine-readable medium 2138 able to store data temporarily or permanently and may be taken to include, but not be limited to, random-access memory (RAM), read-only memory (ROM), buffer memory, flash memory, and cache memory. While the machine-readable medium 2138 is shown in an example embodiment to be a single medium, the term "machine-readable medium" should be taken to include a single medium or multiple media (e.g., a centralized or distributed database, or associated caches and servers) able to store the instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 2150 include a wide variety of components to receive input, provide output, produce output, transmit information, exchange information, capture measurements, and so on. In general, it will be appreciated that the I/O components 2150 can include many other components that are not shown in FIG. 21. The I/O components 2150 are grouped according to functionality merely for simplifying the following discussion, and the grouping is in no way limiting. In various example embodiments, the I/O components 2150 include output components 2152 and input components 2154. The output components 2152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2154 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 2150 include biometric components 2156, motion components 2158, environmental components 2160, or position components 2162, among a wide array of other components. For example, the biometric components 2156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 include acceleration sensor components (e.g., accelerometer), gravitation sensor components, rotation sensor components (e.g., gyroscope), and so forth. The environmental components 2160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 2162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 2150 may include communication components 2164 operable to couple the machine 2100 to a network 2180 or devices 2170 via a coupling 2182 and a coupling 2172, respectively. For example, the communication components 2164 include a network interface component or another suitable device to interface with the network 2180. In further examples, communication components 2164 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 2170 may be another machine or any of a wide variety of peripheral devices (e.g., a peripheral device coupled via a Universal Serial Bus (USB)).

Moreover, in some embodiments, the communication components 2164 detect identifiers or include components operable to detect identifiers. For example, the communication components 2164 include Radio Frequency Identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 2164, such as location via Internet Protocol (IP) geo-location, location via WI-FI® signal triangulation, location via detecting an BLUETOOTH® or NFC beacon signal that may indicate a particular location, and so forth.

Transmission Medium

In various example embodiments, one or more portions of the network 2180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 2180 or a portion of the network 2180 may include a wireless or cellular network, and the coupling 2182 may be a Code Division Multiple Access (CDMA) connection, a Global System for Mobile communications (GSM) connection, or another type of cellular or wireless coupling. In this example, the coupling 2182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 2116 are transmitted or received over the network 2180 using a transmission medium via a network interface device (e.g., a network interface component included in the communication components 2164) and utilizing any one of a number of well-known transfer protocols (e.g., Hypertext Transfer Protocol (HTTP)). Similarly, in other example embodiments, the instructions 2116 are transmitted or received using a transmission medium via the coupling 2172 (e.g., a peer-to-peer coupling) to the devices 2170. The term "transmission medium" shall be taken to include any intangible medium that is capable of storing, encoding, or carrying the instructions 2116 for execution by the machine 2100, and includes digital or analog communications signals or other intangible media to facilitate communication of such software.

Furthermore, the machine-readable medium 2138 is non-transitory (in other words, not having any transitory signals) in that it does not embody a propagating signal. However, labeling the machine-readable medium 2138 "non-transitory" should not be construed to mean that the medium is incapable of movement; the medium should be considered as being transportable from one physical location to another. Additionally, since the machine-readable medium 2138 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   a geolocation pictograph server computer for managing communication of content comprising geolocation based pictographs, the server computer comprising:
   a storage device configured to store a submission from a configuration device of a submitting entity, the submission comprising a custom pictograph, a geographic indication that corresponds to the custom pictograph, and an entity-specified criterion associated with access to the custom pictograph, the entity-specified criterion being met when a biometric sensor of a user device determines a user heart rate level exceeds a threshold level;
   one or more processors coupled to the storage device and configured to:
   process, using a geolocation module, a communication from a user device comprising a current geolocation of the user device;
   identify, using a pictograph module of the geolocation pictograph server computer, the custom pictograph based on the current geolocation from the user device and the geographic indication;
   determine, by the pictograph module based on the communication from the user device, a satisfaction of the entity-specified criterion;
   in response to the pictograph module identifying the custom pictograph and determining that the entity-specified criterion is satisfied, initiate a communication to the user device for presentation of the custom pictograph on a user interface of the user device;
   receive, from the user device at a communication module implemented using the one or more processors, a user message with a request to transmit the user message to a device of another user, wherein the user message further comprises image content generated by the user device for presentation with the custom pictograph; and
   cause transmission of the user message that includes the custom pictograph and the image content to the device of another user.

2. The system of claim 1, wherein the pictograph module is further configured to:
   compare the current geolocation and a specified geolocation that corresponds to the custom pictograph, wherein the specified geolocation is indicated by the geographic indication; and
   identify the custom pictograph based on a determination that the user device is within a perimeter of the specified geolocation.

3. The system of claim 1 further comprising the user device; wherein the user device comprises:
   an image sensor configured to capture the image content;
   a location sensor configured to determine the current geolocation of the user device;
   an output display configured to output the user interface;
   user device storage memory coupled to the image sensor and configured to store the image content from the image sensor; and
   one or more user device processors coupled to the user device storage memory, the output display, and the location memory, the one or more user device processors configured to:
   initiate capture of the image content using the image sensor;
   communicate, to the server computer, the current geolocation of the user device;
   receive, from the server computer based on the current geolocation of the user device, the communication for presentation of the custom pictograph on the user interface of the user device;
   initiate display of the image content and at least the custom pictograph for message composition on the user interface;
   process a user selection of the custom pictograph to be included in the user message with the image content; and
   initiate transmission of the user message to the device of another user via the server computer.

4. The system of claim 1 wherein the user message is an ephemeral message associated with a predefined duration such that after the predefined duration elapses, the user message is deleted and is no longer accessible.

5. A method comprising:
receiving, at a geolocation pictograph server computer from a configuration device of a submitting user, a submission of a pictograph, a geographic indication corresponding to the pictograph, and a user-specified criterion associated with availability of the pictograph, the user-specified criterion being met when a biometric sensor of a user device determines a user heart rate level exceeds a threshold level;
receiving, from the user device, a request for a pictograph, the request including a current geolocation of the user device;
in response to the request for the pictograph, identifying, using a hardware processor of the geolocation pictograph server computer, the pictograph based on the current geolocation and the geographic indication;
determining a satisfaction of the user-specified criterion;
based on the identifying of the pictograph based on the current geolocation and the determined satisfaction of the user-specified criterion, initiating a communication to the user device for presentation of the identified pictograph on a user interface of the user device;
receiving, at the geolocation pictograph server computer from the user device, a user message with a request to transmit the user message to a device of another user, wherein the user message comprises image content generated by the user device for presentation with the identified pictograph; and
causing transmission of the user message that includes the identified pictograph and the image content generated by the user device to a device of another user.

6. The method of claim 5, further comprising:
comparing the current geolocation and a specified geolocation corresponding to the pictograph, wherein the specified geolocation is indicated by the geographic indication; and
identifying the pictograph based on determining that the user device is within a perimeter of the specified geolocation.

7. The method of claim 6, further comprising:
receiving an indication of a time period corresponding to the pictograph and the specified geolocation; and
causing presentation of the pictograph on the user interface of the user device in response to the user device being within the perimeter of the specified geolocation during the time period.

8. The method of claim 5, further comprising:
performing a query for an entity identifier corresponding to the current geolocation;
comparing the entity identifier with a specified entity identifier corresponding to the pictograph, wherein the specified entity identifier is indicated by the geographic indication; and
identifying the pictograph based on a match between the entity identifier and the specified entity identifier.

9. The method of claim 5, further comprising:
causing inclusion of the identified pictograph into a virtual keyboard included in the user interface of the user device, wherein a selection of the pictograph included in the virtual keyboard renders the pictograph alongside characters generated in response to key selections from the virtual keyboard, wherein the virtual keyboard comprises a portable virtual keyboard used in conjunction with a third party application of the user device.

10. The method of claim 5, further comprising:
identifying a display parameter of the user device, the display parameter including at least one of a display resolution, a display text size, or a display image size; and
causing a rendering of the identified pictograph based on the identified display parameter.

11. The method of claim 5, further comprising:
preventing the user device from accessing the pictograph based on the current geolocation being outside a perimeter of a specified geolocation indicated by the geographic indication.

12. The method of claim 5, further comprising:
identifying a plurality of pictographs corresponding to the current geolocation;
determining a portion of the plurality of pictographs; and
causing presentation of the portion of the plurality of pictographs on the user interface of the user device.

13. The method of claim 12, further comprising determining the portion of the plurality of pictographs by:
accessing user data corresponding to a user of the user device, the user data including member profile data of the user retrieved from a social messaging service;
inferring a user preference based on the user data; and
determining the portion of the plurality of pictographs according to the user preference.

14. The method of claim 12, further comprising determining the portion of the plurality of pictographs by:
receiving device data from the ser device, the device data including sensor data detected at the user device;
inferring a user status based on the device data; and
determining the portion of the plurality of pictographs according to the user status.

15. The method of claim 12, further comprising determining the portion of the plurality of pictographs by:
retrieving, from a third-party server, situational data pertaining to the current geolocation and a current time; and
determining the portion of the plurality of pictographs according to the situational data.

16. The method of claim 12; further comprising:
receiving, from the user device, an indication of a selected pictograph among the plurality of pictographs;
storing the indication of the selected pictograph in association with a user of the user device; and
determining a subsequent portion of the plurality of pictographs according to the stored indication of the selected pictograph.

17. The method of claim 12, further comprising:
accessing indications of a selected pictograph of users other than a user of the user device for respective pictographs of the plurality of pictographs; and
determining the portion of the plurality of pictographs according to the indications of the selected pictograph of the users other than the user of the user device.

18. The method of claim 12, further comprising:
ranking the plurality of pictographs according to a popularity of respective pictographs of the plurality of pictographs; the popularity based on a message use count of the respective pictographs of the plurality of pictographs, the message use count incremented for each selection of a particular pictograph by a particular user; and causing presentation of the ranked plurality of pictographs on the user interface of the user device.

19. The method of claim 18, further comprising:
modifying the respective pictographs of the plurality of pictographs to indicate the popularity of the respective pictographs of the plurality of pictographs; and
causing presentation of the modified respective pictographs of the plurality of pictographs on the user interface of the user device.

20. The method of claim 5, further comprising:
receiving, from bidding entities, bid amounts corresponding to the geographic indication;
identifying a highest bid amount from among the bid amounts, the highest bid amount corresponding to a winning entity;
receiving from the winning entity the pictograph corresponding to the geographic indication; and
identifying the pictograph based on the current geolocation, the geographic indication, and the highest bid amount.

21. The method of claim 5, further comprising:
determining a price corresponding to the geographic indication based on an active member count of a social messaging service, the active member count being associated with the geographic indication; and
providing to the configuration device of the submitting user an offer, for sale at the determined price, that includes an option to provide the pictograph to be presented on the user interface of the user device in response to the request associated with the geographic indication.

22. A method comprising:
capturing, by an image sensor of a user device, image content;
determining a current geolocation of the user device using a location sensor of the user device;
communicating the current geolocation of the user device to a server computer;
receiving, at the user device from the server computer, a submission of a pictograph, a geographic indication corresponding to the pictograph, and a criterion associated with availability of the pictograph, the criterion being met when a biometric sensor of the user device determines a user heart rate level exceeds a threshold level, wherein the pictograph is identified at the server computer based on the current geolocation of the user device;
determining a satisfaction of the criterion;
based on the determined satisfaction of the criterion, causing presentation of the identified pictograph with the image content for message composition on a user interface of a display of the user device;
process a user selection of the identified pictograph to be included in a user message with the image content;
receiving a request to transmit a user message that udes the identified pictograph and the image content; and
transmitting the user message that includes the identified pictograph and the image content to a device of another user via the server computer.

23. The method of claim 22, further comprising:
storing, at the user device; the pictograph and the geographic indication corresponding to the pictograph; and
identifying the pictograph based on the current geolocation and the geographic indication corresponding to the pictograph.

24. A machine-readable medium having no transitory signals and storing instructions that, when executed by at least one processor of a geolocation pictograph server computer, cause the geolocation pictograph server computer to perform operations comprising:
receiving, from a configuration device of a submitting entity, a submission of a pictograph, a geographic indication corresponding to the pictograph, and an entity-specified criterion associated with availability of the pictograph, the entity-specified criterion being met when a biometric sensor of a user device determines a user heart rate level exceeds a threshold level;
receiving a communication from the user device comprising a request for a pictograph with geolocation data of the user device;
in response to the request for the pictograph, identifying the pictograph based on the geolocation data and the geographic indication;
determining a satisfaction of the entity-specified criterion;
based on the identifying of the pictograph from the geolocation data and the geographic indication and on the determined satisfaction of the entity-specified criterion, transmitting the identified pictograph to the user device for presentation on a user interface of the user device;
receiving, at the geolocation pictograph server computer from the user device, a user message with a request to transmit the user message to a device of another user; wherein the user message comprises image content generated by the user device for presentation with the identified pictograph; and
causing transmission of the user message that includes the identified pictograph and the image content generated by the user device to a device of another user.

25. The machine-readable medium of claim 24, wherein the operations further comprise:
comparing the geolocation data and the geographic indication with a specified geolocation corresponding to the pictograph, wherein the specified geolocation is indicated by, the geographic indication; and
identifying the pictograph based on determining that the user device is within a perimeter of the specified geolocation.

* * * * *